(12) United States Patent
Harvey et al.

(10) Patent No.: US 12,511,854 B2
(45) Date of Patent: Dec. 30, 2025

(54) RENDERING SETTING SELECTOR

(71) Applicant: PassiveLogic, Inc., Holladay, UT (US)

(72) Inventors: Troy Aaron Harvey, Brighton, UT (US); Alec Aaron Nelson, Holladay, UT (US)

(73) Assignee: PassiveLogic, Inc., Holladay, UT (US)

( * ) Notice: Subject to any disclaimer, the term of this patent is extended or adjusted under 35 U.S.C. 154(b) by 141 days.

(21) Appl. No.: 18/497,085

(22) Filed: Oct. 30, 2023

(65) Prior Publication Data
US 2025/0139921 A1    May 1, 2025

(51) Int. Cl.
G06T 15/10 (2011.01)
G06T 15/20 (2011.01)
G06T 19/20 (2011.01)

(52) U.S. Cl.
CPC .............. G06T 19/20 (2013.01); G06T 15/20 (2013.01); *G06T 2200/24* (2013.01); *G06T 2210/04* (2013.01); *G06T 2219/2004* (2013.01); *G06T 2219/2016* (2013.01)

(58) Field of Classification Search
None
See application file for complete search history.

(56) References Cited

U.S. PATENT DOCUMENTS

2008/0266295 A1* 10/2008 Temesvari .............. G06T 19/00
345/427
2018/0143023 A1* 5/2018 Bjorke .................. G06T 19/003

* cited by examiner

*Primary Examiner* — Carl Adams

(57) ABSTRACT

Various embodiments relate to a method, apparatus, and machine-readable storage medium including one or more of the following: associating a first floorplan image with a first surface in a three-dimensional scene; associating a second floorplan image with a second surface in the three-dimensional scene, wherein the first surface and second surface are vertically-aligned; rendering a stacked floorplan image of the three-dimensional scene, whereby the stacked floorplan image includes image data read from both the first floorplan image and the second floorplan image; and displaying the stacked floorplan image on the user interface.

20 Claims, 23 Drawing Sheets

400b
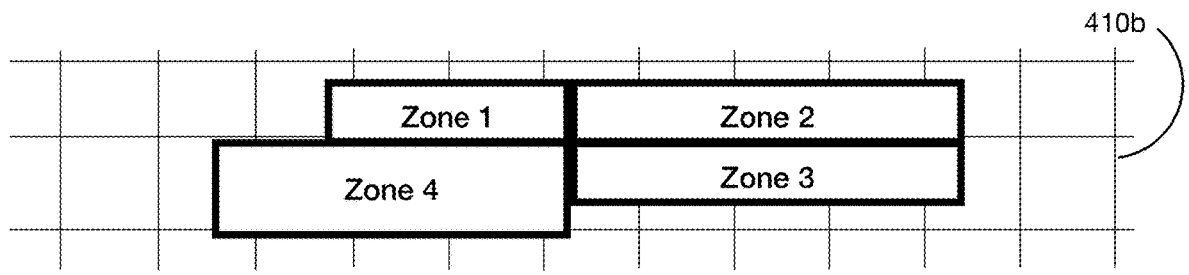
410b
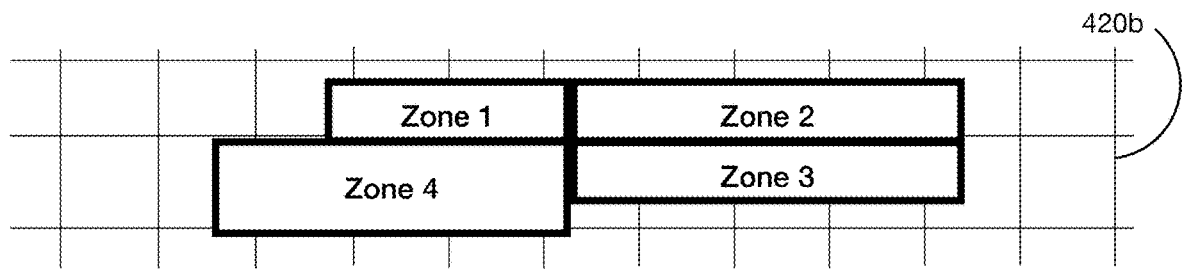
420b
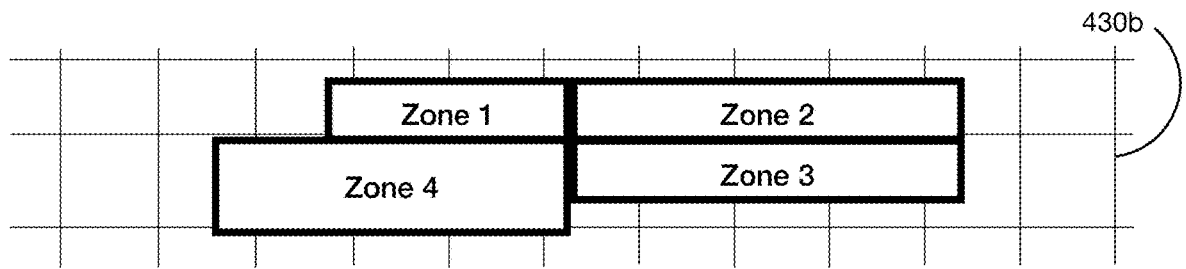
430b
*FIG. 4B*

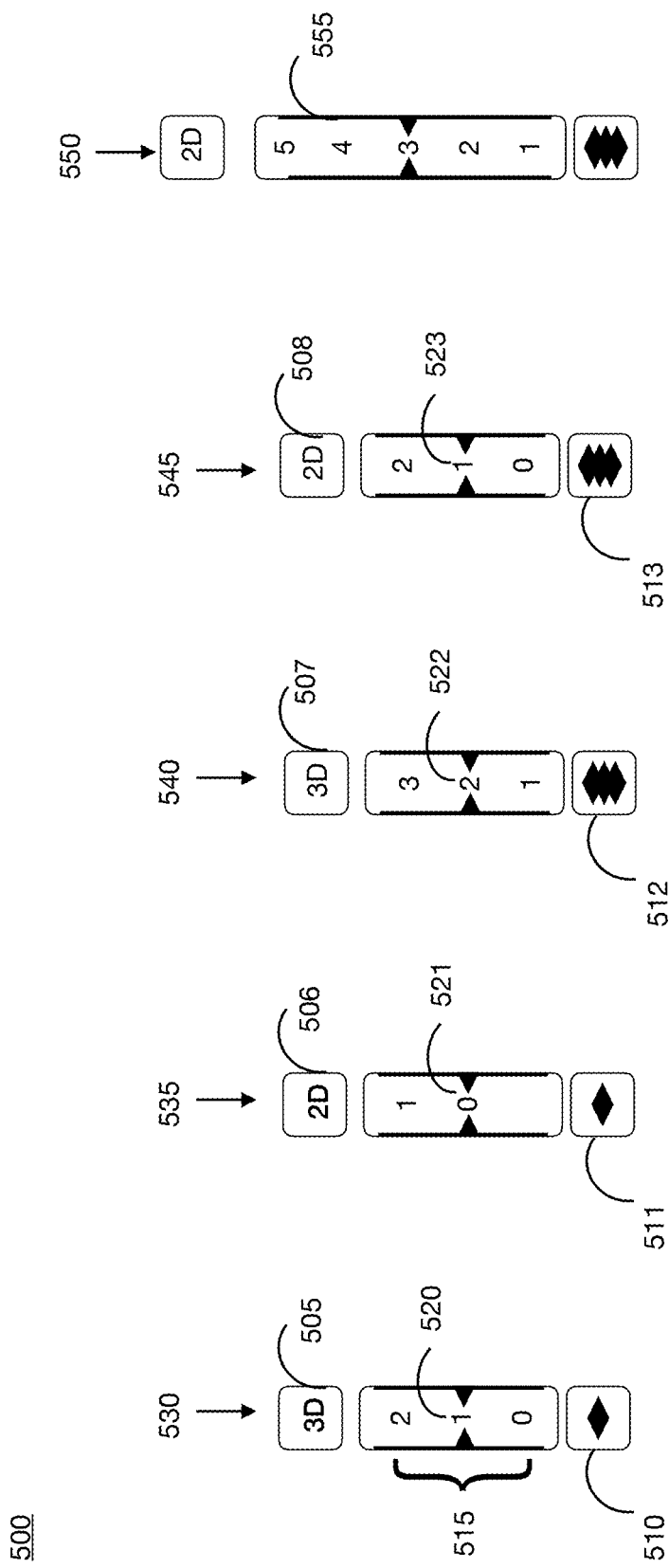

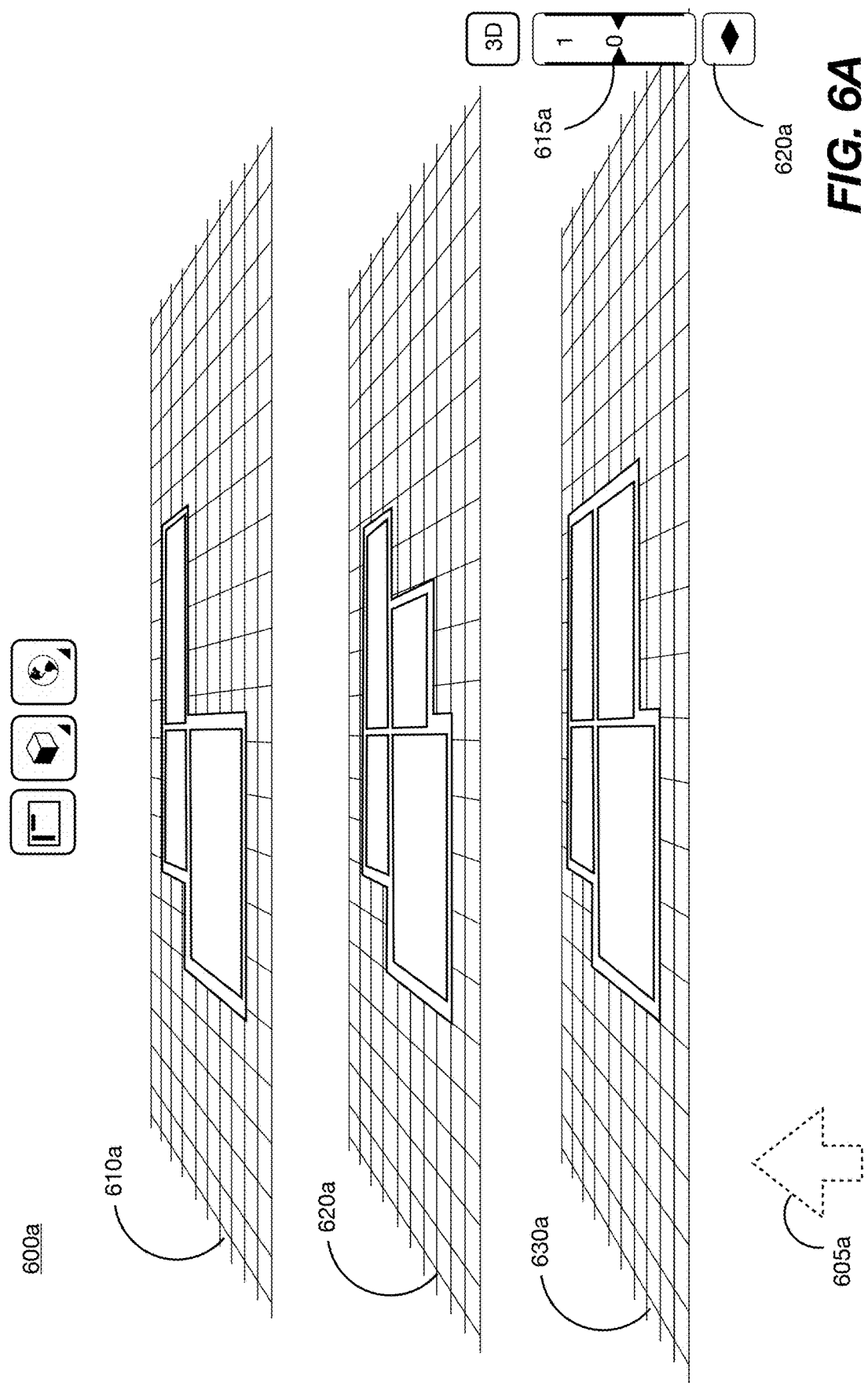

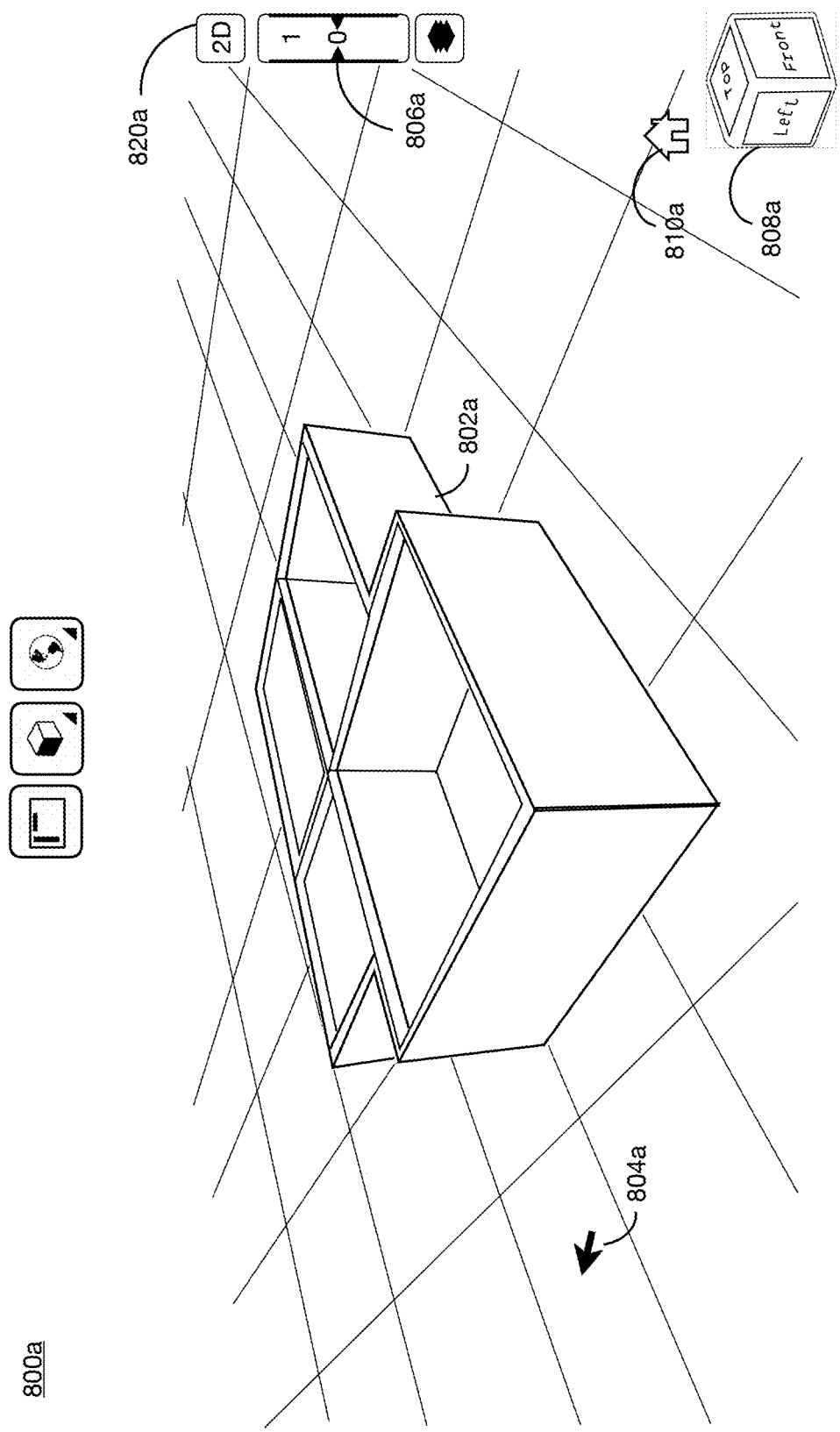

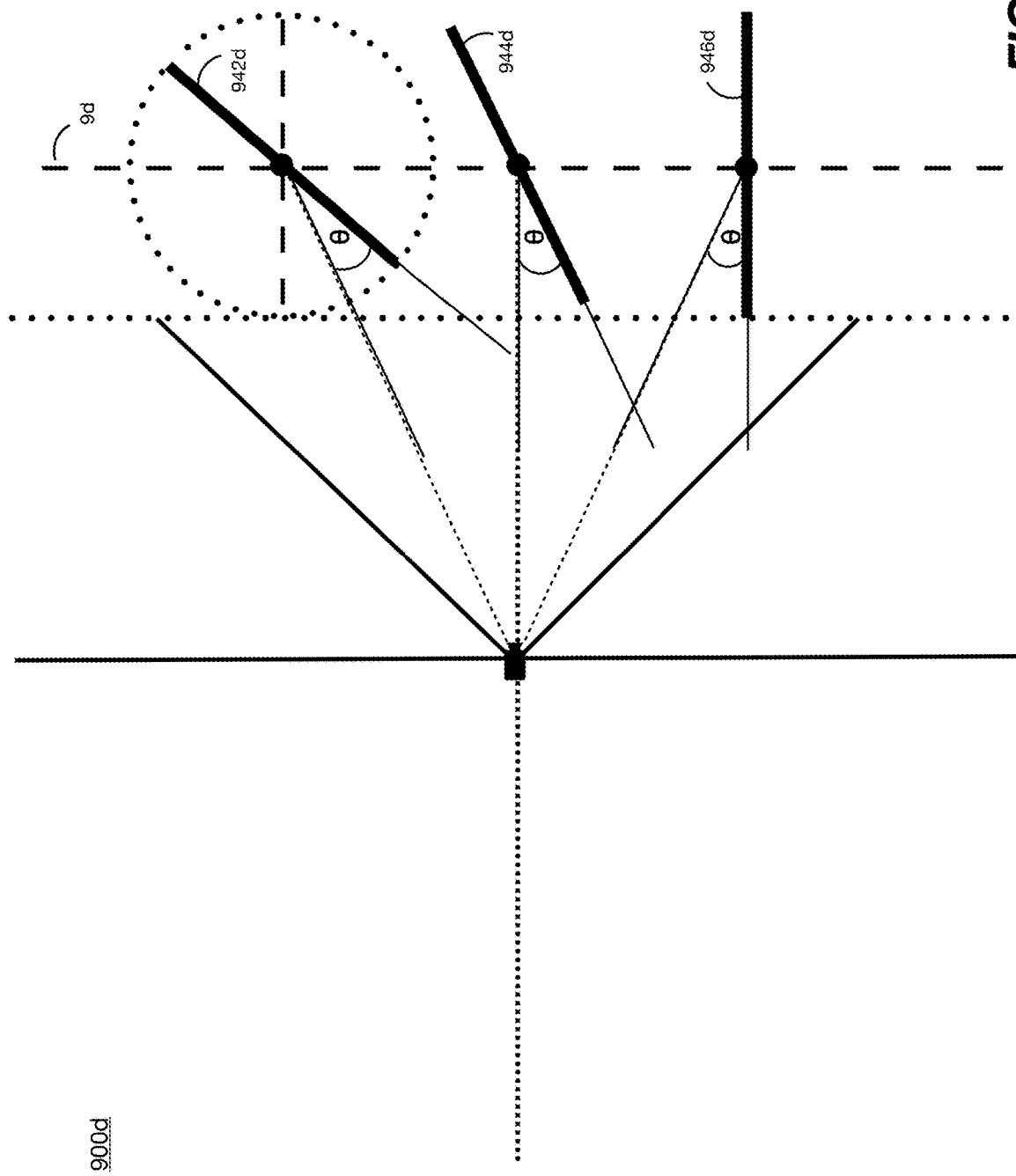

RENDERING SETTING SELECTOR

TECHNICAL FIELD

Various embodiments described herein relate to design and simulation tools and more particularly, but not exclusively, to tools for displaying different views of building plans for use in programs that allow construction and modification of structures with multiple floors.

BACKGROUND

In building computer aided design programs, it is often useful to visualize a building being designed in multiple views, such as in three dimensions, two dimensions, with multiple floors, a single floor only, and so on, to be able to visualize the structure more fully and to understand the building as a whole and as a series of parts. This process, however, multiplies the amount of work the designer must do, as the designer must set up multiple persnickety views, select from among many menu items, mark a new location then wait for the structure to be rendered, etc. Even when such views are preset, it may take significant time to render a new view when so desired.

SUMMARY

According to the foregoing, it would be desirable to provide a method of viewing multiple floorplans of a building in a way that conveys the most information. According to various embodiments, a method is described to create a view of multiple floors that combines elements of an orthographic projection and a perspective projection. Various other technical benefits will be apparent in view of the following description.

Various embodiments described herein relate to a method for displaying a set of floorplans on a user interface, which includes: associating a first floorplan image with a first surface in a three-dimensional scene; associating a second floorplan image with a second surface in the three-dimensional scene, and where the first surface and the second surface are aligned vertically.

Various embodiments described herein include rendering a stacked floorplan image of the three-dimensional scene, such that the stacked floorplan image includes image data read from both the first floorplan image and the second floorplan image; and displaying the stacked floorplan image on the user interface.

Various embodiments described herein include the first surface and the second surfaces being two-dimensional surfaces.

Various embodiments described herein include the first two-dimensional surface being rotated in a third dimension by a first number of degrees along a y-z axis.

Various embodiments described herein include the second two-dimensional surface being rotated in the third dimension by a second number of degrees.

Various embodiments described herein include accepting user rotation input; and the first and second surfaces being rotated by an amount associated with the user rotation input.

Various embodiments described herein include the first and second surfaces being placed along rays cast from a virtual camera used to create the three-dimensional scene.

Various embodiments described herein include the rays being within a YZ plane and they are cast at equal angles within a frustum of the three-dimensional scene.

Various embodiments described herein include a vertical field of view in degrees of the three-dimensional scene being divided to determine location of the rays.

Various embodiments described herein include the vertical field of view in degree being divided equally.

Various embodiments describe herein include a non-transitory machine-readable medium encoded with instructions for execution by a processor for displaying floorplans on a user interface. The non-transitory machine-readable medium including instructions for associating a first floorplan image with a first surface in a three-dimensional scene; instructions for associating a second floorplan image with a second surface in the three-dimensional scene, wherein the first surface and second surface are vertically-aligned; instructions for rendering a stacked floorplan image of the three-dimensional scene, whereby the stacked floorplan image includes image data read from both the first floorplan image and the second floorplan image; and instructions for displaying the stacked floorplan image on the user interface.

Various embodiments described herein include instructions for accepting user input of a selection of a floor on the displayed floorplan image producing a selected floorplan image.

Various embodiments described herein include instructions for rendering the selected floorplan image in an orthographic projection; and instructions for displaying the selected floorplan image.

Various embodiments described herein include instructions for allowing a user to edit the selected floorplan image.

Various embodiments described herein include instructions where the second surface includes a two-dimensional surface, and instructions for rotating the two-dimensional surface in the third dimension by a second number of degrees.

Various embodiments described herein include instructions for accepting user rotation input and instructions for rotating the stacked floorplan image an amount associated with the user rotation input.

Various embodiments described herein include instructions for rendering the rotated stacked floorplan image and instructions for displaying the rotated stacked floorplan image on the user interface.

Various embodiments described herein include a device for displaying a set of floorplans, the device including: a memory storing description of at least a first floorplan image and a second floorplan image; and a processor in communication with the memory configured to: associate the first floorplan image with a first surface in a three-dimensional scene; associate the second floorplan image with a second surface in the three-dimensional scene, wherein the first surface and second surface are vertically-aligned; render a stacked floorplan image of the three-dimensional scene, whereby the stacked floorplan image includes image data read from both the first floorplan image and the second floorplan image; and display the stacked floorplan image on the user interface.

Various embodiments described herein include the first surface being placed along a first ray cast from a virtual camera origin used to create the three-dimensional scene in a y axis, and the second surface being placed along a second ray cast from the virtual camera origin in the y axis.

Various embodiments described herein include accepting user input indicating selection of a floorplan within the stacked floorplan image; and displaying the image associated with the selected floorplan in an orthographic view.

Various embodiments described herein include creating an animation of the image associated with the selected floorplan moving from its location within the stacked floorplan to an orthographic view.

Various embodiments described herein include the first surface being rotated a first number of degrees and the second surface being rotated a second number of degrees.

Various embodiments described herein include the first number of degrees and the second number of degrees being equal.

Various embodiments described herein include a method, device, or non-transitory machine-readable storage medium encoded with instructions for execution by a processor for displaying a set of floorplans, each floorplan associated with a floor. The method, device, or non-transitory storage medium includes one or more of the following: displaying, on a user interface, a first portion of a widget with a first toggle to display the set of floorplans in two dimensions or to display the set of floorplan three dimensions; displaying, on the user interface, a second portion of the widget with a second toggle to display one floorplan of the set of floorplans or to display multiple floorplans of the set of floorplans; displaying, on the user interface, a third portion of the widget with a floor picker to choose a floorplan among the set of floorplans available in the floorplan; detecting user input associated with the widget; receiving the user input associated with the widget rearranging a three-dimensional scene associated with the set of floorplans according to the received user input; rendering the rearranged three-dimensional scene into a 2D image; and displaying the 2D image on the user interface.

Various embodiments described herein include an original image, and where displaying the 2D image on the user interface further comprises displaying an animation comprising movement between the original image and the 2D image.

Various embodiments described herein include before detecting user input associated with the widget, displaying the original image on the user interface.

Various embodiments described herein include the detecting a user input including detecting the first toggle has changed.

Various embodiments described herein include when the user interface is displaying a three-dimensional image, rearranging the three-dimensional scene to a two-dimensional view; and when the user interface displaying a three-dimensional image, rearranging the three-dimensional scene to a two-dimensional view.

Various embodiments described herein include a method, device, or non-transitory machine-readable storage medium encoded with instructions for execution by a processor for displaying a set of floorplans, for using a GUI interface object with a widget display area on a device with a user interface, the method including one or more of the following: displaying the widget with one or more widget states on the user interface; in response to receiving a first input associated with the widget, modifying a three-dimensional scene associated with the at least a portion of the floorplan set to a state associated with the first input associated with the widget; rendering the three-dimensional scene into a two-dimensional image; and displaying the two-dimensional image on the user interface.

Various embodiments described herein include a method, device, or non-transitory machine-readable storage medium encoded with instructions for execution by a processor, the method including one or more of the following: displaying a rendering setting selector on a user interface, wherein the rendering setting selector displays a current rendering setting; rendering the digital twin according to the current rendering setting to produce a first graphical representation of the digital twin; displaying the first graphical representation of the digital twin; receiving a user input via the rendering setting selector; updating the rendering setting selector to display a new rendering setting in response to the user input; rendering the digital twin according to the new rendering setting to product a second graphical representation of the digital twin; and displaying the second graphical representation of the digital twin.

Various embodiments described herein include a method, device, or non-transitory machine-readable storage medium encoded with instructions for execution by a processor, the method, device, or non-transitory storage medium including one or more of the following: the current rendering setting specifying a three-dimensional rendering method; the first graphical rendering being a three-dimensional rendering of a physical structure represented by the digital twin; the new rendering setting specifying a two-dimensional rendering method; and the second graphical rendering is a two-dimensional rendering of the physical structure represented by the digital twin.

Various embodiments described herein include one or more of the following: the digital twin modeling a first portion and a second portion of a physical structure; the current rendering setting specifying a single portion rendering method; the first graphical rendering being a rendering of the first portion of the physical structure; the new rendering setting specifying a multiple portion rendering method; and the second graphical rendering being a rendering of the first portion and the second portion of the physical structure.

Various embodiments described herein include one or more of the following: the digital twin modeling a first portion and a second portion of a physical structure; the current rendering setting identifying the first portion; the first graphical rendering being a rendering of the first portion of the physical structure; the new rendering setting identifying the second portion; and the second graphical rendering being a rendering of the second portion of the physical structure.

Various embodiments described herein include one or more of the following: prior to rendering the digital twin, modifying a 3D scene that represents at least a portion of the digital twin.

BRIEF DESCRIPTION OF THE DRAWINGS

In order to better understand various example embodiments, reference is made to the accompanying drawings, wherein:

FIG. 4B illustrates an example multiple floorplan viewer with an orthographic projection;

FIG. 5 illustrates some embodiments of a rending setting selector;

FIGS. 6A-6B illustrates example two-dimensional multiple floorplan views with a combined perspective/orthographic projection in motion;

FIG. 8A illustrates an example three-dimensional single floor floorplan view;

FIGS. 9A-9D illustrate example views for implementing a perspective and orthographic projection;

DETAILED DESCRIPTION

The description and drawings presented herein illustrate various principles. It will be appreciated that those skilled in the art will be able to devise various arrangements that, although not explicitly described or shown herein, embody these principles and are included within the scope of this disclosure. As used herein, the term, "or," as used herein, refers to a non-exclusive or (i.e., and/or), unless otherwise indicated (e.g., "or else" or "or in the alternative"). Additionally, the various embodiments described herein are not necessarily mutually exclusive and may be combined to produce additional embodiments that incorporate the principles described herein.

Figure 1:
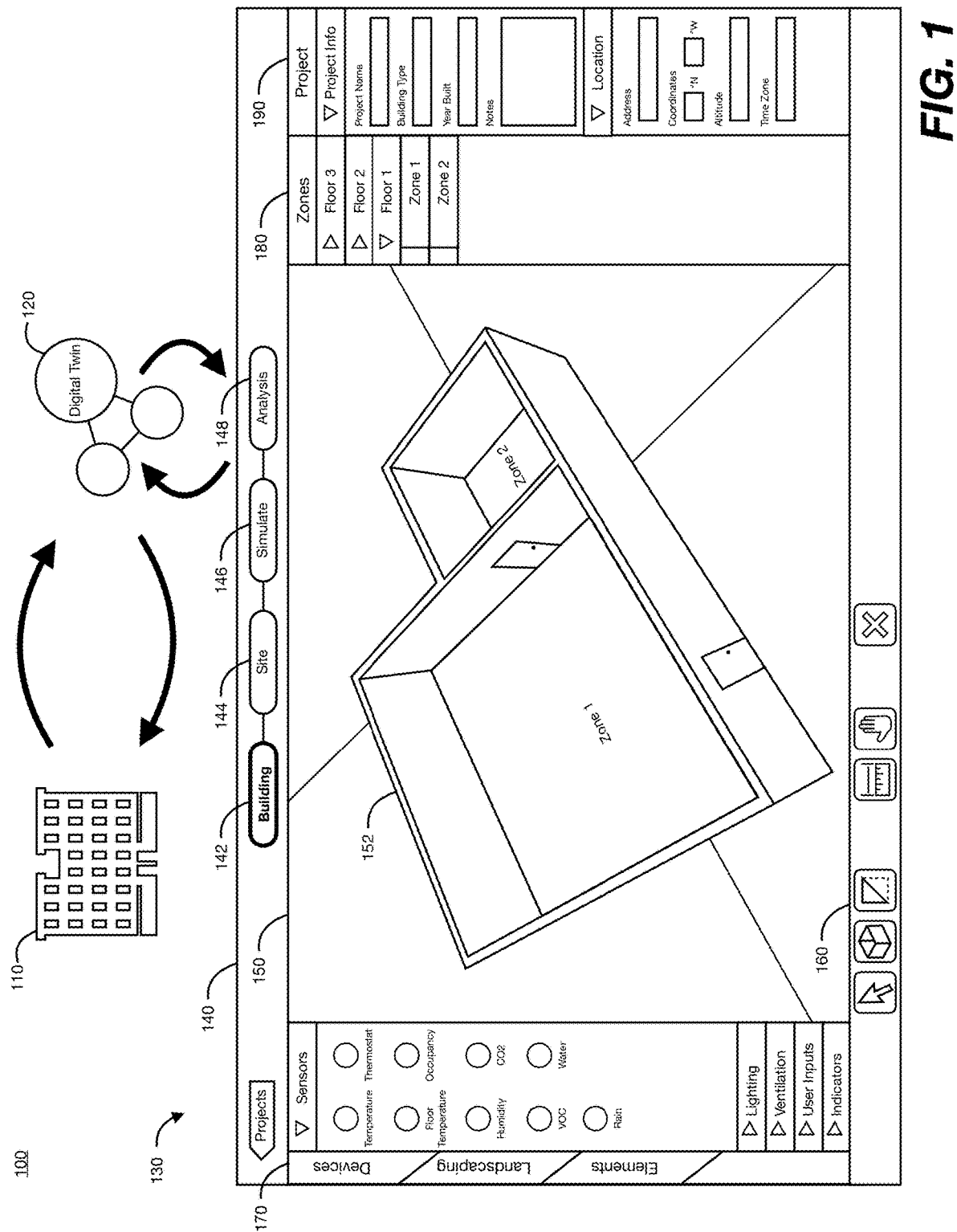
FIG. 1 illustrates an example system for implementation of various embodiments.

FIG. 1 illustrates an example system 100 for implementation of various embodiments. As shown, the system may include an environment 110, at least some aspect of which is modeled by a digital twin 120. The digital twin 120, in turn, interacts with a digital twin application suite 130 for providing a user with various means for interaction with the digital twin 120 and for gaining insights into the real-world environment 110. According to one specific set of examples, the environment 110 is a building while the digital twin 120 models various aspects of that building such as, for example, the building structure, its climate conditions (e.g., temperature, humidity, etc.), and a system of controllable heating, ventilation, and air conditioning (HVAC) equipment.

While various embodiments disclosed herein will be described in the context of such an HVAC application or in the context of building design and analysis, it will be apparent that the techniques described herein may be applied to other applications including, for example, applications for controlling a lighting system, a security system, an automated irrigation or other agricultural system, a power distribution system, a manufacturing or other industrial system, or virtually any other system that may be controlled. Further, the techniques and embodiments may be applied other applications outside the context of controlled systems or environments 110 that are buildings. Virtually any entity or object that may be modeled by a digital twin may benefit from the techniques disclosed herein. Various modifications to adapt the teachings and embodiments to use in such other applications will be apparent.

The digital twin 220 is a digital representation of one or more aspects of the environment 110. In various embodiments, the digital twin 220 is implemented as a heterogenous, omnidirectional neural network. As such, the digital twin 220 may provide more than a mere description of the environment 110 and rather may additionally be trainable, computable, queryable, and inferencable, as will be described in greater detail below. In some embodiments, one or more processes continually, periodically, or on some other iterative basis adapts the digital twin 120 to better match observations from the environment 110. For example, the environment 110 may be outfitted with one or more temperature sensors that provide data to a building controller (not shown), which then uses this information to train the digital twin to better reflect the current state or operation of the environment. In this way, the digital twin is a "living" digital twin that, even after initial creation, continues to adapt itself to match the environment 110, including adapting to changes such as system degradation or changes (e.g., permanent changes such as removing a wall and transient changes such as opening a window).

Various embodiments of the techniques described herein may use alternative types of digital twins than the heterogenous neural network type described in most examples herein. For example, in some embodiments, the digital twin 120 may not be organized as a neural network and may, instead, be arranged as another type of model for one or more components of the environment 110. In some such embodiments, the digital twin 120 may be a database or other data structure that simply stores descriptions of the system aspects, environmental features, or devices being modeled, such that other software has access to data representative of the real world objects and entities, or their respective arrangements, as the software performs its functions.

The digital twin application suite 130 may provide a collection of tools for interacting with the digital twin 120 such as, for example, tools for creating and modifying the digital twin 120; using the digital twin to design a building manually or using generative methods 120; using the digital twin to perform site planning and analysis for the building 120; using the digital twin to perform simulations of the environment 110; or using the digital twin to provide an interactive live building information model (BIM) of the environment. It will be understood that while the application suite 130 is depicted here as a single user interface that the application suite 130 includes a mix of hardware and software, including software for performing various backend functions and for providing multiple different interface scenes (such as the one shown) for enabling the user to interact with the digital twin 120 in different ways and using different tools and applications in the application suite 130.

As shown, the digital twin application suite 130 currently displays an interface scene for providing user access to and interaction with a building design application. This building design application may be used for various purposes such as for designing a building to be built (e.g., before the building 110 has been built) or for designing renovations or retrofits to an existing building. As will be explained in greater detail below, the design of a building using this building design application drives creation or modification of the digital twin 120 itself. As such, the building design application may also be used as a digital twin creator, to capture the structure of an existing building 110 in the digital twin 120, so that the digital twin 120 can be used by other applications (including those provided by the digital twin application suite 130 or by other external applications such as a controller that autonomously controls the HVAC or other controllable system of the environment 110).

The digital twin application suite's 130 current interface scene includes a collection of panels, including a navigation panel 140, a workspace 150, a tool panel 160, a library panel 170, a exploration panel 170, and a project information panel 180. Various alternative embodiments will include a different set of panels or other overall graphical interface designs that enable access to the applications, tools, and techniques described herein.

As noted, the digital twin application suite 130 may display only one interface scene of a multi-interface suite or software package. The navigation panel 140 includes a set of ordered indicators 142, 144, 146, 148 conveying a workflow for design, simulation, and analysis using a digital twin 120 and the various applications of the application suite 130. These include a Building indicator 142 associated with a building design application and associated interface scene(s); a Site indicator 144 associated with a site planning application and associated interface scene(s); a Simulate indicator 146 associated with a simulation application and associated interface scene(s); and an Analysis indicator 148 associated with a live building analysis application and associated interface scene(s). The Building indicator 142 has an altered appearance compared to the other indicators 144, 146, 148 (here, bold text and thick outer lines, but any alteration can be used) to indicate that it is the presently active step or application, and is associated with the presently-displayed interface scene. In some embodiments, visual or other cues can be used to indicate additional workflow information: that the steps associated with indicators have been completed, that the current step is ready or not ready to be completed, that there is a problem with a step associated with an indicator, etc. In some embodiments, the indicators 142, 144, 146, 148 may be interface buttons that enable, upon user click, tap, or other selection, the user to change the interface scene to another interface scene associated with the selected indicator 142, 144, 146, 148.

The workspace 150 includes an area where a user may view, explore, construct, or modify the building (or other entities or objects to be represented by the digital twin 120). As shown, the workspace 150 already displays a three-dimensional rendering 152 of a building including at least a single floor and two rooms (labeled zone 1 and zone 2). Various controls (not shown) may be provided to the user for altering the user's view of the building rendering 152 within the workspace 150. For example, the user may be able to rotate, zoom, or pan the view of the building rendering 152 in one or more dimensions using mouse controls (click and drag, mouse wheel, etc.) or interface controls that can be selected. The user may also be provided with similar controls for altering the display of the building rendering, such as toggling between two-dimensional and three-dimensional views or changing the portion of the building that is rendered (e.g., rendering alternative or additional floors from a multi-floor building).

The tool panel 160 includes a number of buttons that provide access to a variety of interface tools for interacting with the workspace 150 or building rendering 152. For example, buttons may be provided for one or more of the previously-described interactions for changing the view of the building rendering 152. As another example, the tool panel 160 may provide buttons for accessing tools to modify the building rendering 152 itself. For example, tools may be accessible via the tool bar 160 for adding, deleting, or changing the dimensions of zones in the building rendering 152; adding, deleting, or changing structural features such as doors and windows; adding, deleting, or changing non-structural assets such as chairs and shelves; or for specifying properties of any of the foregoing.

The library panel 170 includes multiple expandable categories of items that may be dragged and dropped by the user into the workspace for addition to the building rendering 152. Such items may be functional, such as various devices for sensing conditions of the building, providing lighting and ventilation, receiving system input from users, or providing output or other indicators to users. Other items may be purely aesthetic or may provide other information about the building (e.g., placement of shelves may help to determine an amount of shelf space). As before, placement of these items may indicate that these items are expected to be installed in the environment 110 or are already installed in the environment 110 so as to make the digital twin 120 aware of their presence.

While the foregoing examples speak of user tools for creating or making modifications to the building rendering 152, in various embodiments this functionality occurs by way of creation or modification of the digital twin 120. That is, when a user interacts with the workspace to create, e.g., a new zone, digital twin application suite 130 updates the digital twin 120 to include the new zone and new walls surrounding the zone, as well as any other appropriate modifications to other aspects of the digital twin (e.g., conversion of exterior walls to interior walls). Then, once the digital twin 120 is updated, the digital twin application suite 130 renders the currently displayed portion of the digital twin 120 into the building rendering 152, thereby visually reflecting the changes made by the user. Thus, not only does the building design application of the digital twin application suite 130 provide a computer aided design (CAD) tool, it simultaneously facilitates creation and modification of the digital twin 120 for use by other applications or to better inform the operation of the CAD functionality itself (e.g., by providing immediate feedback on structural feasibility at the time of design or by providing generative design functionality to automatically create various structures which may be based on user-provided constraints or preferences).

The exploration panel 180 provides a tree view of the digital twin to enable the user to see a more complete view of the digital twin or to enable easy navigation. For example, if the full digital twin is a multi-story building, the exploration panel 180 may provide access to all floors and zones, where the workspace is only capable of displaying a limited number of floors at the level of detail desired by the user.

The project information panel 190 provides the user with interface elements for defining properties of the build or project to which the building is associated. For example, the user may be able to define a project name, a building type, a year of construction, and various notes about the project. This meta-data may be useful for the user in managing a portfolio of such projects. The project information panel 190 may also allow the user to specify the location of the building. Such information may be used by other applications such as site planning (e.g., to digitally recreate the real world environment where the building is located or will be built) or simulation (e.g., to simulate the typical weather and sun exposure for the building). Various other applications for the digital twin application suite 130 will be described below as appropriate to illustrate the techniques disclosed herein.

Figure 2:
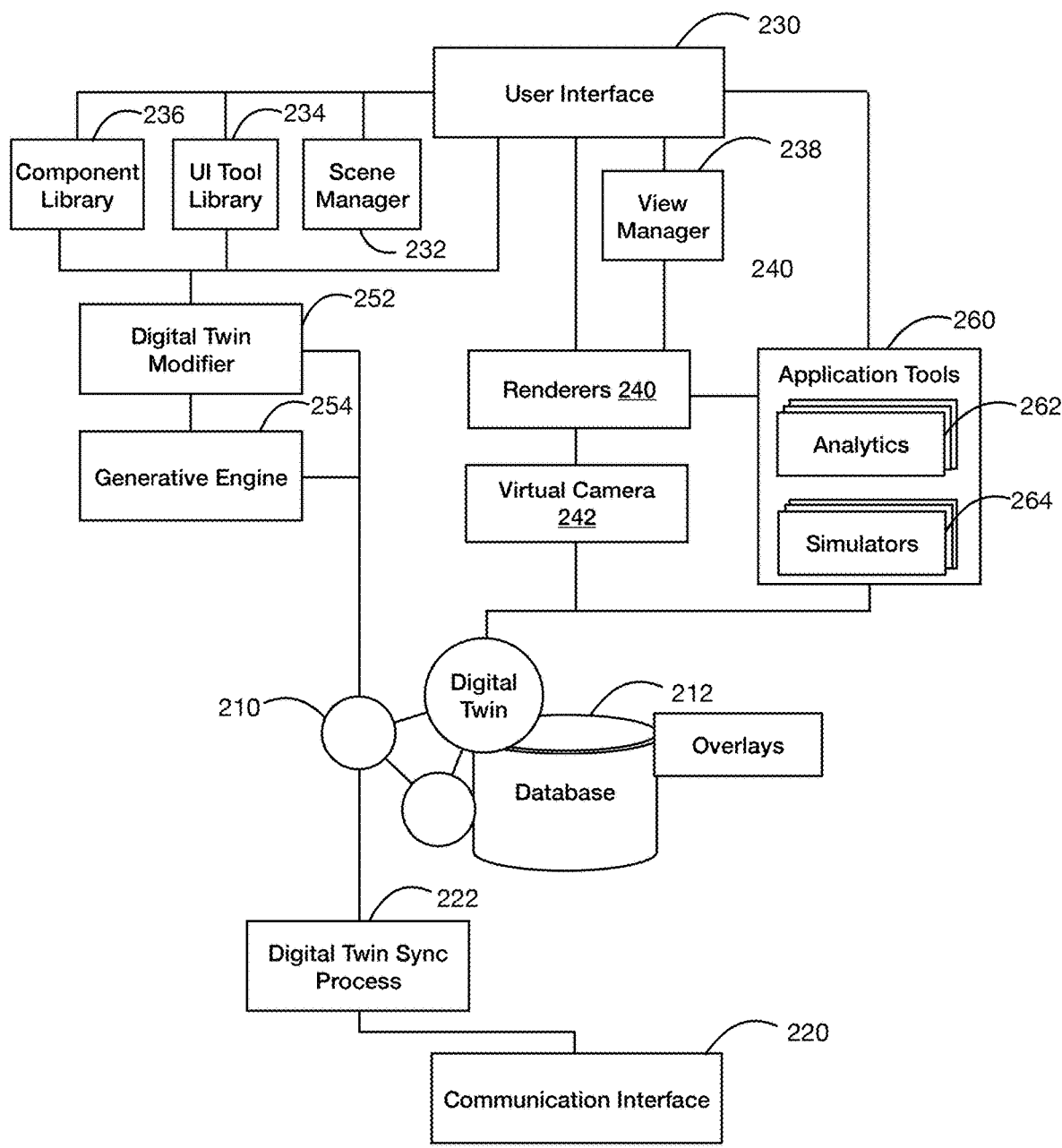
FIG. 2 illustrates an example device for implementing a digital twin application suite.

FIG. 2 illustrates an example device for implementing a digital twin application suite 200. The digital twin application device 200 may correspond to the device that provides digital twin application suite 130 and, as such, may provide a user with access to one or more applications for interacting with a digital twin.

The digital twin application device 200 includes a digital twin 210, which may be stored in a database 212. The digital twin 210 may correspond to the digital twin 120 or a portion thereof (e.g., those portions relevant to the applications provided by the digital twin application device 200) The digital twin 210 may be used to drive or otherwise inform many of the applications provided by the digital twin application device 200. A digital twin 210 may be any data structure that models a real-life object, device, system, or other entity. Examples of a digital twin 210 useful for various embodiments will be described in greater detail below with reference to FIG. 3. While various embodiments will be described with reference to a particular set of heterogeneous and omnidirectional neural network digital twins, it will be apparent that the various techniques and embodiments described herein may be adapted to other types of digital twins. In some embodiments, additional systems, entities, devices, processes, or objects may be modeled and included as part of the digital twin 210.

In some embodiments, the digital twin 210 may be created and used entirely locally to the digital twin application device 200. In others, the digital twin may be made available to or from other devices via a communication interface 220. The communication interface 220 may include virtually any hardware for enabling connections with other devices, such as an Ethernet network interface card (NIC), WiFi NIC, or USB connection.

A digital twin sync process 222 may communicate with one or more other devices via the communication interface 220 to maintain the state of the digital twin 210. For example, where the digital twin application device 200 creates or modifies the digital twin 210 to be used by other devices, the digital twin sync process 222 may send the digital twin 210 or updates thereto to such other devices as the user changes the digital twin 210. Similarly, where the digital twin application device 200 uses a digital twin 210 created or modified by another device, the digital twin sync process 222 may request or otherwise receive the digital twin 210 or updates thereto from the other devices via the communication interface 220, and commit such received data to the database 212 for use by the other components of the digital twin application device 200. In some embodiments, both of these scenarios simultaneously exist as multiple devices collaborate on creating, modifying, and using the digital twin across various applications. As such, the digital twin sync process 222 (and similar processes running on such other devices) may be responsible for ensuring that each device participating in such collaboration maintains a current copy of the digital twin, as presently modified by all other such devices. In various embodiments, this synchronization is accomplished via a pub/sub approach, wherein the digital twin sync process 222 subscribes to updates to the digital twin 222 and publishes its own updates to be received by similarly-subscribed devices. Such a pub/sub approach may be supported by a centralized process, such as a process running on a central server or central cloud instance.

To enable user interaction with the digital twin, the digital twin application device 200 includes a user interface 230. For example, the user interface 230 may include a display, a touchscreen, a keyboard, a mouse, or any device capable of performing input or output functions for a user. In some embodiments, the user interface 230 may instead or additionally allow a user to use another device for such input or output functions, such as connecting a separate tablet, mobile phone, or other device for interacting with the digital twin application device 200. In some embodiments, the user interface 230 includes a web server that serves interfaces to a remote user's personal device (e.g., via the communications interface). Thus, in some embodiments, the applications provided by the digital twin application device 200 may be provided as a web-based software-as-a-service (SaaS) offering.

The user interface 230 may rely on multiple additional components for constructing one or more graphical user interfaces for interacting with the digital twin 210. A scene manager 232 may store definitions of the various interface scenes that may be offered to the user. As used herein, an interface scene will be understood to encompass a collection of panels, tools, and other GUI elements for providing a user with a particular application (or set of applications). For example, four interface scenes may be defined, respectively for a building design application, a site analysis application, a simulation application, and a live building analysis application. It will be understood that various customizations and alternate views may be provided to a particular interface scene without constituting an entirely new interface scene. For example, panels may be rearranged, tools may be swapped in and out, and information displayed may change during operation without fundamentally changing the overall application provided to the user via that interface scene.

The UI tool library 234 stores definitions of the various tools that may be made available to the user via the user interface 230 and the various interface scenes (e.g., by way of a selectable interface button). These tool definitions in the UI tool library 234 may include software defining manners of interaction that add to, remove from, or modify aspects of the digital twin. As such, tools may include a user-facing component that enables interaction with aspects of the user interface scene, and a digital twin-facing component that captures the context of the user's interactions, and instructs the digital twin modifier 252 or generative engine 254 to make appropriate modifications to the digital twin 210. For example, a tool may be included in the UI tool library 234 that enables the user to create a zone. On the UI side, the tool enables the user to draw a square (or other shape) representing a new zone in a UI workspace. The tool then captures the dimensions of the zone and its position relative to the existing architecture, and passes this context to the digital twin modifier 252, so that a new zone can be added to the digital twin 210 with the appropriate position and dimensions.

A component library 236 stores definitions of various digital objects that may be made available to the user via the user interface 230 and the various interface scenes (e.g., by way of a selection of objects to drag-and-drop into a workspace). These digital objects may represent various real-world items such as devices (e.g., sensors, lighting, ventilation, user inputs, user indicators), landscaping, and other elements. The digital objects may include two different aspects: an avatar that will be used to graphically represent the digital object in the interface scene and an underlying digital twin that describes the digital object at an ontological or functional level. When the user indicates that a digital twin should be added to the workspace, the component library provides that object's digital twin to the digital twin modifier 252 so that it may be added to the digital twin 210.

A view manager 238 provides the user with controls for changing the view of the building rendering. For example, the view manager 238 may provide one or more interface controls to the user via the user interface to rotate, pan, or zoom the view of a rendered building; toggle between two-dimensional and three-dimensional renderings; or change which portions (e.g., floors) of the building are shown. In some embodiments, the view manager may also provide a selection of canned views from which the user may choose to automatically set the view to a particular state. The user's interactions with these controls are captured by the view manager 238 and passed on to the virtual cameras 242 and the renderers 240, to inform the operation thereof. In some embodiments, a renderer setting selector 244 may pass specific information to the view manager 238 to indicate which selection of canned views should be used.

The renderers 240 include a collection of libraries for generating the object representations that will be displayed via the user interface 230. In particular, where a current interface scene is specified by the scene manager 232 as including the output of a particular renderer 240, the user interface 230 may activate or otherwise retrieve image data from that renderer for display at the appropriate location on the screen.

Some renderers 240 may render the digital twin (or a portion thereof) in visual form. For example, a building renderer may translate the digital twin 210 into a visual depiction of one or more floors of the building it represents. The manner in which this is performed may be driven by the user via settings passed to the building renderer or the virtual camera 242 via the view manager. For example, depending on the user input, the virtual camera may generate a 3D scene (or transform an existing 3D scene) and pass to the building renderer may a two-dimensional plan view of floors 2, 3, and 4; a three-dimensional isometric view of floor 1 from the southwest corner; or a rendering of the exterior of the entire building.

Some renderers 240 may maintain their own data for rendering visualizations. For example, in some embodiments, the digital twin 210 may not store sufficient information to drive a rendering of the site of a building. For example, rather than storing map, terrain, and architectures of surrounding buildings in the digital twin 210, a site renderer may obtain this information based on the specified location for the building. In such embodiments, the site renderer may obtain this information via the communication interface 220, generate intermediate description of the surrounding environment (e.g., descriptions of the shapes of other buildings in the vicinity of the subject building), and store this for later user (e.g., in the database 212, separate from the digital twin). Then, when the user interface 230 calls on the site renderer to provide a site rendering, the site renderer uses this intermediate information along with the view preferences provided by the view manager, to render a visualization of the site and surrounding context. In other embodiments where the digital twin 210 does store sufficient information for rendering the site (or where other digital twins are available to the digital twin application device 200 with such information), the site renderer may render the site visualization based on the digital twin in a manner similar to the building renderer 240.

Some renderers 240 may produce visualizations based on information stored in the digital twin (as opposed to rendering the digital twin itself). For example, the digital twin 210 may store a temperature value associated with each zone. An overlay renderer may produce an overlay that displays the relevant temperature value over each zone rendered by the building renderer. Similarly, some renderers 240 may produce visualizations based on information provided by other components. For example, an application tool 260 may produce an interpolated gradient of temperature values across the zones and the overlay renderer may produce an overlay with a corresponding color-based gradient across the floors of each zone rendered by the building renderer.

Some renderers 240 may produce visualizations based on information stored in the digital twin (as opposed to rendering the digital twin itself). For example, the digital twin 210 may store a temperature value associated with each zone. An overlay renderer may produce an overlay that displays the relevant temperature value over each zone rendered by the building renderer. Similarly, some renderers 240 may produce visualizations based on information provided by other components. For example, an application tool 260 may produce an interpolated gradient of temperature values across the zones and the overlay renderer may produce an overlay with a corresponding color-based gradient across the floors of each zone rendered by the building renderer.

The collaboration between virtual camera and renderers 240 is used to craft the images destined for the user interface 230. Serving as a digital counterpart to a physical camera, the virtual camera defines critical attributes such as position, orientation, and field of view for a 3D scene. The 3D scene may be a representation of physical or metaphorical aspects of a digital twin, such as a building floorplan, a hierarchical database layout, a cluster database visualization, a combined hierarchical-cluster visual layout, etc. As such, the 3D scene may be composed from elements stored in the database 212, user input, etc. When using representations of physical elements, the database may include colors, textures, dimensions, and other aspects stored in the database 212 used to define portions of the digital twin in two or three dimensions. The virtual camera is the "eye" through which the 3D scene is observed, setting the stage for rendering by one or more renderers. The virtual camera assumes the role of determining the viewpoint and perspective for rendering, dictating which portion of the three-dimensional scene enters the frame. It also handles the selection of projection type, which can encompass perspective, orthographic, isometric, oblique, axonometric, fish-eye, or a multi-view projection which creates views with combinations of different projections. Depending on aspects of the scene, the type of scene, the state of a rending setting selector, etc, the virtual camera applies the appropriate projection matrix, effectively transforming the three-dimensional environment into a two-dimensional plane. Following this projection onto the two-dimensional plane, the renderer 240 takes over, rendering the flattened scene. The 3D scene may be kept alive for an extended period. As the 3D scene is defined by the digital twin, e.g., 120, the basic 3D aspects can be determined beforehand, and can be kept alive while the same digital twin or portion of the digital twin is used by a specific application, or multiple applications. By keeping a 3D scene alive during a period when the scene may be used multiple times, then applying an appropriate projection matrix and rendering, many different views of a 3D scene may be rapidly generated. In certain implementations, the virtual camera provides a transformation matrix used by the renderer 240 to accurately generate the final two-dimensional image. For example, a digital twin may include floors. These floors may have building components, such as discussed with reference to FIG. 3. Each of these features, such as the external walls e.g., 311, doors e.g., 314, windows, etc., may have 3D information associated with them, such that a 3D floorplan may be constructed for each floor in a building using the digital twin database, e.g. 212. Each of these floors may be embodied in a 3D scene that can be reused when viewing the building. Making changes to the floors so displayed may also change the 3D scene, and change the underlying digital twin database.

As noted above, while various tools in the UI tool library 234 provide a user experience of interacting directly with the various renderings shown in the interface scene, these tools actually provide a means to manipulate the digital twin 210. These changes are then picked up by the renderers 240 and virtual camera 242 for display. To enable these changes to the digital twin, a digital twin modifier 252 provides a library for use by the UI tool library 234, user interface 230, component library 236 or other components of the digital twin application device 200. The digital twin modifier 252 may be capable of various modifications such as adding new nodes to the digital twin; removing nodes from the digital twin; modifying properties of nodes; adding, changing, or removing connections between nodes; or adding, modifying, or removing sets of nodes (e.g., as may be correlated to a digital object in the component library 236). In many instances, the user instructs the digital twin modifier 252 what changes to make to the digital twin 210 (via the user interface 230, UI tool library 234, or other component). For example, a tool for adding a zone, when used by the user, directly instructs the digital twin modifier to add a zone node and wall nodes surrounding it to the digital twin. As another example, where the user interface 230 provides a slider element for modifying an R-value of a wall, the user interface 230 will directly instruct the digital twin to find the node associated with the selected wall and change the R-value thereof.

In some cases, one or more contextual, constraint-based, or otherwise intelligent decisions are to be made in response to user input to determine how to modify the digital twin 210. These more complex modifications to the digital twin 210 may be handled by the generative engine 254. For example, when a new zone is drawn, the walls surrounding it may have difference characteristics depending on whether they should be interior or exterior walls. This decision, in turn, is informed by the context of the new zone in relation to other zones and walls. If the wall will be adjacent another zone, it should be interior; if not, it should be exterior. In this case, the generative engine 254 may be configured to recognize specific contexts and interpret them according to, e.g., a rule set to product the appropriate modifications to the digital twin 210.

As another example, in some embodiments, a tool may be provided to the user for generating structure or other object based on some constraint or other setting. For example, rather than using default or typical roof construction, the user may specify that the roof should be dome shaped. Then, when adding a zone to the digital twin, the generative engine may generate appropriate wall constructions and geometries, and any other needed supports, to provide a structurally-sound building. To provide this advanced functionality, the generative engine 254 may include libraries implementing various generative artificial intelligence techniques. For example, the generative engine 254 may add new nodes to the digital twin, create a cost function representing the desired constraints and certain tunable parameters relevant to fulfilling those constraints, and perform gradient descent to tune the parameters of the new nodes to provide a constraint (or other preference) solving solution.

Various interface scenes may provide access to additional application tools 260 beyond means for modifying the digital twin and displaying the results. As shown, some possible application tools include one or more analytics tools or simulators 264. The analytics tools 262 may provide advanced visualizations for showing the information captured in the digital twin 262. As in an earlier mentioned example, an analytics tool 262 may interpolate temperatures across the entire footprint of a floorplan, so as to enable an overlay renderer (not shown) to provide an enhanced view of the temperature of the building compared to the point temperatures that may be stored in each node of the digital twin 210. In some embodiments, these analytics and associated overlay may be updated in real time. To realize such functionality, a separate building controller (not shown) may continually or periodically gather temperature data from various sensors deployed in the building. These updates to that building controller's digital twin may then be synchronized to the digital twin 210 (through operation of the digital twin sync process 222), which then drives updates to the analytics tool.

As another example, an analytics tool 262 may extract entity or object locations from the digital twin 210, so that the overlay renderer 246 can then render a live view of the movement of those entities or objects through the building. For example, where the building is a warehouse, inventory items may be provided with RFID tags and an RFID tracking system may continually update its version of the building digital twin with inventory locations. Then, as this digital twin is continually or periodically synced to the local digital twin 210, the object tracking analytics tool 262 may extract this information from the digital twin 262 to be rendered. In this way, the digital twin application device 200 may realize aspects of a live, operational BIM.

The application tools 260 may also include one or more simulators 264. As opposed to the analytics tools 262 which focus on providing informative visualizations of the building as it is, the simulator tools 264 may focus on predicting future states of the building or predicting current states of the building that are not otherwise captured in the digital twin 210. For example, a shadow simulator 264 may use the object models used by the site renderer to simulate shadows and sub exposure on the building rendering. This simulation information may be provided to the renderers 240 for rendering visualizations of this shadow coverage. As another example, an operation simulator 264 may simulate operations of the digital twin 210 into the future and provide information for the user interface 230 to display graphs of the simulated information. As one example, the operation simulator 264 may simulate the temperature of each zone of the digital twin 210 for 7 days into the future. The associated interface scene may then drive the user interface to construct and display a line graph from this data so that the user can view and interact with the results. Various additional application tools 260, methods for integrating their results into the user interface 230, and methods for enabling them to interact with the digital twin 210 will be apparent.

Figure 3:
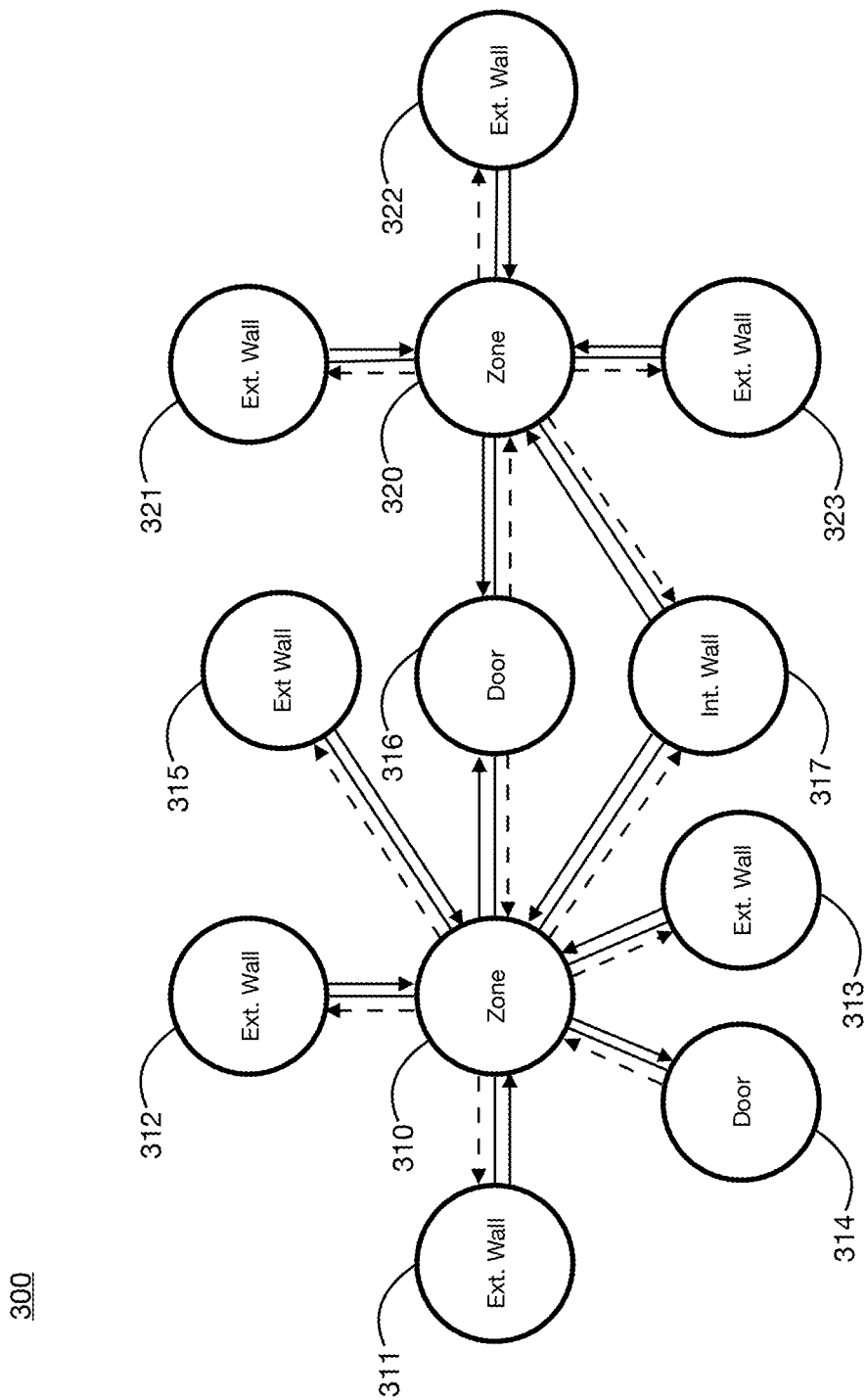
FIG. 3 illustrates an example digital twin for construction by or use in various embodiments.

FIG. 3 illustrates an example digital twin 300 for construction by or use in various embodiments. The digital twin 300 may correspond, for example, to digital twin 120 or digital twin 210. As shown, the digital twin 300 includes a number of nodes 310, 311, 312, 313, 314, 315, 316, 320, 321, 322, 323 connected to each other via edges. As such, the digital twin 300 may be arranged as a graph, such as a neural network. In various alternative embodiments, other arrangements may be used. Further, while the digital twin 300 may reside in storage as a graph type data structure, it will be understood that various alternative data structures may be used for the storage of a digital twin 300 as described herein. The nodes 310-323 may correspond to various aspects of a building structure such as zones, walls, and doors. The edges between the nodes 310-323 may, then, represent between the aspects represented by the nodes 310-323 such as, for example, adjacency for the purposes of heat transfer.

As shown, the digital twin 300 includes two nodes 310, 320 representing zones. A first zone node 310 is connected to four exterior wall nodes 311, 312, 313, 315; two door nodes 314, 316; and an interior wall node 317. A second zone node 320 is connected to three exterior wall nodes 321, 322, 323; a door node 316; and an interior wall node 317. The interior wall node 317 and door node 316 are connected to both zone nodes 310, 320, indicating that the corresponding structures divide the two zones. This digital twin 300 may thus correspond to a two-room structure, such as the one depicted by the building rendering 152 of FIG. 1.

It will be apparent that the example digital twin 300 may be, in some respects, a simplification. For example, the digital twin 300 may include additional nodes representing other aspects such as additional zones, windows, ceilings, foundations, roofs, or external forces such as the weather or a forecast thereof. It will also be apparent that in various embodiments the digital twin 300 may encompass alternative or additional systems such as controllable systems of equipment (e.g., HVAC systems).

According to various embodiments, the digital twin 300 is a heterogenous neural network. Typical neural networks are formed of multiple layers of neurons interconnected to each other, each starting with the same activation function. Through training, each neuron's activation function is weighted with learned coefficients such that, in concert, the neurons cooperate to perform a function. The example digital twin 300, on the other hand, may include a set of activation functions (shown as solid arrows) that are, even before any training or learning, differentiated from each other, i.e., heterogenous. In various embodiments, the activation functions may be assigned to the nodes 310-323 based on domain knowledge related to the system being modeled. For example, the activation functions may include appropriate heat transfer functions for simulating the propagation of heat through a physical environment (such as function describing the radiation of heat from or through a wall of particular material and dimensions to a zone of particular dimensions). As another example, activation functions may include functions for modeling the operation of an HVAC system at a mathematical level (e.g., modeling the flow of fluid through a hydronic heating system and the fluid's gathering and subsequent dissipation of heat energy). Such functions may be referred to as "behaviors" assigned to the nodes 310-323. In some embodiments, each of the activation functions may in fact include multiple separate functions; such an implementation may be useful when more than one aspect of a system may be modeled from node-to-node. For example, each of the activation functions may include a first activation function for modeling heat propagation and a second activation function for modeling humidity propagation. In some embodiments, these diverse activation functions along a single edge may be defined in opposite directions. For example, a heat propagation function may be defined from node 310 to node 311, while a humidity propagation function may be defined from node 311 to node 310. In some embodiments, the diversity of activation functions may differ from edge to edge. For example, one activation function may include only a heat propagation function, another activation function may include only a humidity propagation function, and yet another activation function may include both a heat propagation function and a humidity propagation function.

According to various embodiments, the digital twin 300 is an omnidirectional neural network. Typical neural networks are unidirectional-they include an input layer of neurons that activate one or more hidden layers of neurons, which then activate an output layer of neurons. In use, typical neural networks use a feed-forward algorithm where information only flows from input to output, and not in any other direction. Even in deep neural networks, where other paths including cycles may be used (as in a recurrent neural network), the paths through the neural network are defined and limited. The example digital twin 300, on the other hand, may include activation functions along both directions of each edge: the previously discussed "forward" activation functions (shown as solid arrows) as well as a set of "backward" activation functions (shown as dashed arrows).

In some embodiments, at least some of the backward activation functions may be defined in the same way as described for the forward activation functions-based on domain knowledge. For example, while physics-based functions can be used to model heat transfer from a surface (e.g., a wall) to a fluid volume (e.g., an HVAC zone), similar physics-based functions may be used to model heat transfer from the fluid volume to the surface. In some embodiments, some or all of the backward activation functions are derived using automatic differentiation techniques. Specifically, according to some embodiments, reverse mode automatic differentiation is used to compute the partial derivative of a forward activation function in the reverse direction. This partial derivative may then be used to traverse the graph in the opposite direction of that forward activation function. Thus, for example, while the forward activation function from node 311 to node 310 may be defined based on domain knowledge and allow traversal (e.g., state propagation as part of a simulation) from node 311 to node 310 in linear space, the reverse activation function may be defined as a partial derivative computed from that forward activation function and may allow traversal from node 310 to 311 in the derivative space. In this manner, traversal from any one node to any other node is enabled—for example, the graph may be traversed (e.g. state may be propagated) from node 312 to node 313, first through a forward activation function, through node 310, then through a backward activation function. By forming the digital twin as an omnidirectional neural network, its utility is greatly expanded; rather than being tuned for one particular task, it can be traversed in any direction to simulate different system behaviors of interest and may be "asked" many different questions.

According to various embodiments, the digital twin is an ontologically labeled neural network. In typical neural networks, individual neurons do not represent anything in particular; they simply form the mathematical sequence of functions that will be used (after training) to answer a particular question. Further, while in deep neural networks, neurons are grouped together to provide higher functionality (e.g. recurrent neural networks and convolutional neural networks), these groupings do not represent anything other than the specific functions they perform; i.e., they remain simply a sequence of operations to be performed.

The example digital twin 300, on the other hand, may ascribe meaning to each of the nodes 310-323 and edges therebetween by way of an ontology. For example, the ontology may define each of the concepts relevant to a particular system being modeled by the digital twin 300 such that each node or connection can be labeled according to its meaning, purpose, or role in the system. In some embodiments, the ontology may be specific to the application (e.g., including specific entries for each of the various HVAC equipment, sensors, and building structures to be modeled), while in others, the ontology may be generalized in some respects. For example, rather than defining specific equipment, the ontology may define generalized "actors" (e.g., the ontology may define producer, consumer, transformer, and other actors for ascribing to nodes) that operate on "quanta" (e.g., the ontology may define fluid, thermal, mechanical, and other quanta for propagation through the model) passing through the system. Additional aspects of the ontology may allow for definition of behaviors and properties for the actors and quanta that serve to account for the relevant specifics of the object or entity being modeled. For example, through the assignment of behaviors and properties, the functional difference between one "transport" actor and another "transport" actor can be captured.

The above techniques, alone or in combination, may enable a fully-featured and robust digital twin 300, suitable for many purposes including system simulation and control path finding. The digital twin 300 may be computable and trainable like a neural network, queryable like a database, introspectable like a semantic graph, and callable like an API.

As described above, the digital twin 300 may be traversed in any direction by application of activation functions along each edge. Thus, just like a typical feedforward neural network, information can be propagated from input node(s) to output node(s). The difference is that the input and output nodes may be specifically selected on the digital twin 300 based on the question being asked, and may differ from question to question. In some embodiments, the computation may occur iteratively over a sequence of timesteps to simulate over a period of time. For example, the digital twin 300 and activation functions may be set at a particular timestep (e.g., 1 minute), such that each propagation of state simulates the changes that occur over that period of time. Thus, to simulate longer period of time or point in time further in the future (e.g., one minute), the same computation may be performed until a number of timesteps equaling the period of time have been simulated (e.g., 60 one second time steps to simulate a full minute). The relevant state over time may be captured after each iteration to produce a value curve (e.g., the predicted temperature curve at node 310 over the course of a minute) or a single value may be read after the iteration is complete (e.g., the predicted temperature at node 310 after a minute has passed). The digital twin 300 may also be inferenceable by, for example, attaching additional nodes at particular locations such that they obtain information during computation that can then be read as output (or as an intermediate value as described below).

While the forward activation functions may be initially set based on domain knowledge, in some embodiments training data along with a training algorithm may be used to further tune the forward activation functions or the backward activation functions to better model the real world systems represented (e.g., to account for unanticipated deviations from the plans such as gaps in venting or variance in equipment efficiency) or adapt to changes in the real world system over time (e.g., to account for equipment degradation, replacement of equipment, remodeling, opening a window, etc.).

Training may occur before active deployment of the digital twin 300 (e.g., in a lab setting based on a generic training data set) or as a learning process when the digital twin 300 has been deployed for the system it will model. To create training data for active-deployment learning, a controller device (not shown) may observe the data made available from the real-world system being modeled (e.g., as may be provided by a sensor system deployed in the environment 110) and log this information as a ground truth for use in training examples. To train the digital twin 300, that controller may use any of various optimization or supervised learning techniques, such as a gradient descent algorithm that tunes coefficients associated with the forward activation functions or the backward activation functions. The training may occur from time to time, on a scheduled basis, after gathering of a set of new training data of a particular size, in response to determining that one or more nodes or the entire system is not performing adequately (e.g., an error associated with one or more nodes 310-323 passed a threshold or passes that threshold for a particular duration of time), in response to manual request from a user, or based on any other trigger. In this way, the digital twin 300 may be adapted to better adapt its operation to the real world operation of the systems it models, both initially and over the lifetime of its deployment, by tacking itself to the observed operation of those systems.

The digital twin 300 may be introspectable. That is, the state, behaviors, and properties of the 310-323 may be read by another program or a user. This functionality is facilitated by association of each node 310-323 to an aspect of the system being modeled. Unlike typical neural networks where, due to the fact that neurons don't represent anything particularly the internal values are largely meaningless (or perhaps exceedingly difficult or impossible to ascribe human meaning), the internal values of the nodes 310-323 can easily be interpreted. If an internal "temperature" property is read from node 310, it can be interpreted as the anticipated temperature of the system aspect associated with that node 310.

Through attachment of a semantic ontology, as described above, the introspectability can be extended to make the digital twin 300 queryable. That is, ontology can be used as a query language usable to specify what information is desired to be read from the digital twin 300. For example, a query may be constructed to "read all temperatures from zones having a volume larger than 200 square feet and an occupancy of at least 1." A process for querying the digital twin 300 may then be able to locate all nodes 310-323 representing zones that have properties matching the volume and occupancy criteria, and then read out the temperature properties of each. The digital twin 300 may then additionally be callable like an API through such processes. With the ability to query and inference, canned transactions can be generated and made available to other processes that aren't designed to be familiar with the inner workings of the digital twin 300. For example, an "average zone temperature" API function could be defined and made available for other elements of the controller or even external devices to make use of. In some embodiments, further transformation of the data could be baked into such canned functions. For example, in some embodiments, the digital twin 300 itself may not itself keep track of a "comfort" value, which may defined using various approaches such as the Fanger thermal comfort model. Instead, e.g., a "zone comfort" API function may be defined that extracts the relevant properties (such as temperature and humidity) from a specified zone node, computes the comfort according to the desired equation, and provides the response to the calling process or entity.

It will be appreciated that the digital twin 300 is merely an example of a possible embodiment and that many variations may be employed. In some embodiments, the number and arrangements of the nodes 310-323 and edges therebetween may be different, either based on the controller implementation or based on the system being modeled by each deployment of the controller. For example, a controller deployed in one building may have a digital twin 300 organized one way to reflect that building and its systems while a controller deployed in a different building may have a digital twin 300 organized in an entirely different way because the building and its systems are different from the first building and therefore dictate a different model. Further, various embodiments of the techniques described herein may use alternative types of digital twins. For example, in some embodiments, the digital twin 300 may not be organized as a neural network and may, instead, be arranged as another type of model for one or more components of the environment 110. In some such embodiments, the digital twin 300 may be a database or other data structure that simply stores descriptions of the system aspects, environmental features, or devices being modeled, such that other software has access to data representative of the real world objects and entities, or their respective arrangements, as the software performs its functions.

Figure 4A:
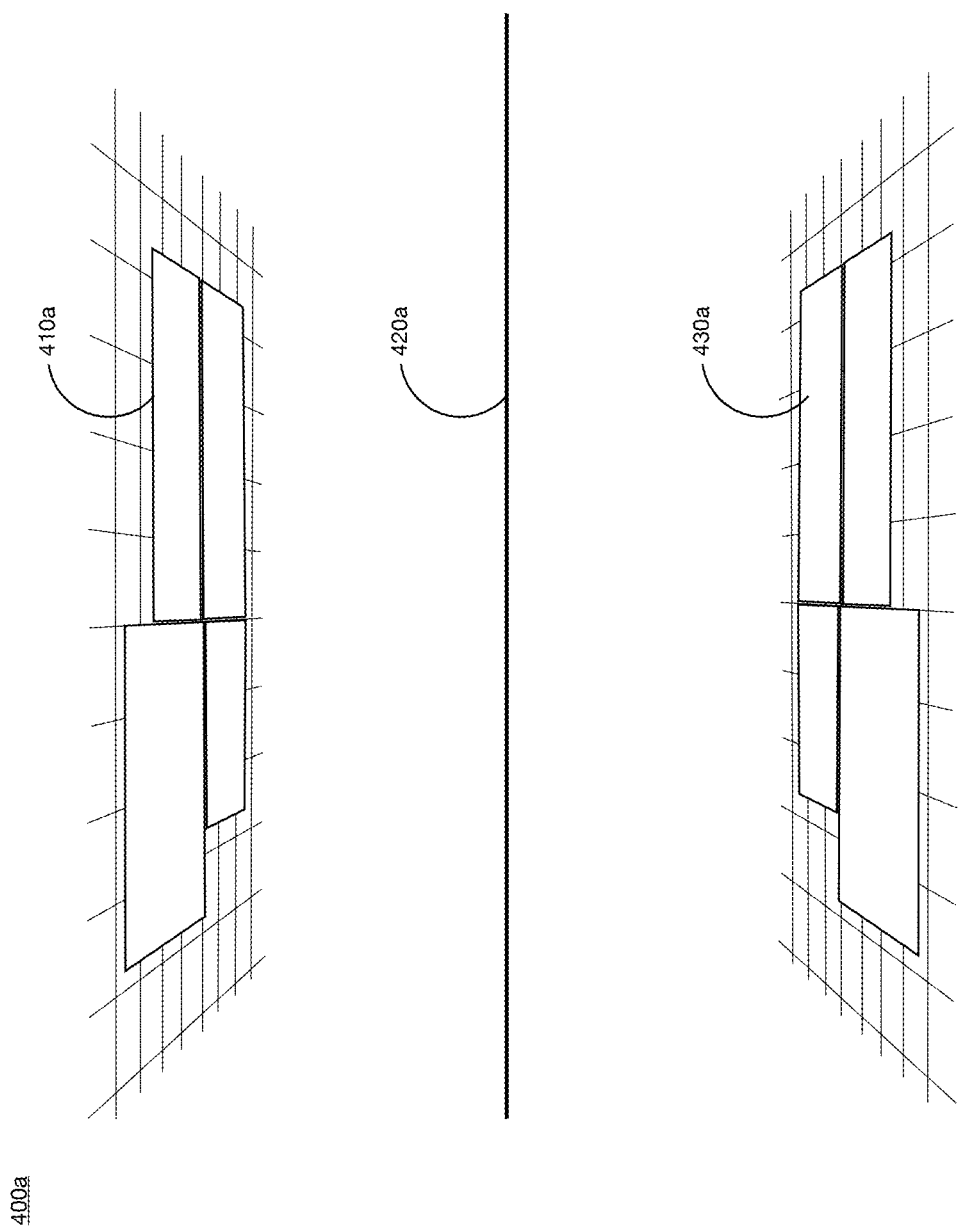
FIG. 4A illustrates an example multiple floorplan viewer with a perspective projection.

Viewing multiple blueprints of floors of a building presents various difficulties using normal views. FIG. 4A illustrates a straight perspective view of three grids representing two-dimensional blueprints of three stories of a building. In a perspective projection objects that are closer to the camera appear lager, while those farther away appear smaller, mimicking the way our eyes perceive the world. However, when multiple perspective projections are used with the same viewing frustum problems may appear. As can be seen with reference to FIG. 4A, where three different two-dimensional grids representing three different floors of a building are being viewed using the same frustum, in a perspective view, the highest grid 410a appears upside down. The middle grid is viewed edge-on 420a and so contains no useful information. The third grid 430a is the only one that is useful, making the multi-story view pointless. FIG. 4B illustrates an orthogonal view of the same blueprints of three stories of a building 400b. In an orthographic projection, objects maintain their size regardless of distance from the camera. When viewed from the same frustum, in an orthographic projection, three two-dimensional grids 410b, 420b, 430b are all foreshortened in a way that is difficult to tell what the actual dimensions are, and thus is also not useful for its intended use. A grid view that combines aspects of both a prospective projection and an orthographic projection, e.g., as shown with reference to FIG. 4C would add to the usability of a building display, make making changes to the underlying definition of the blueprints, and, therefore, make using a building display or creation program with such a grid much simpler to use.

Figure 4C:
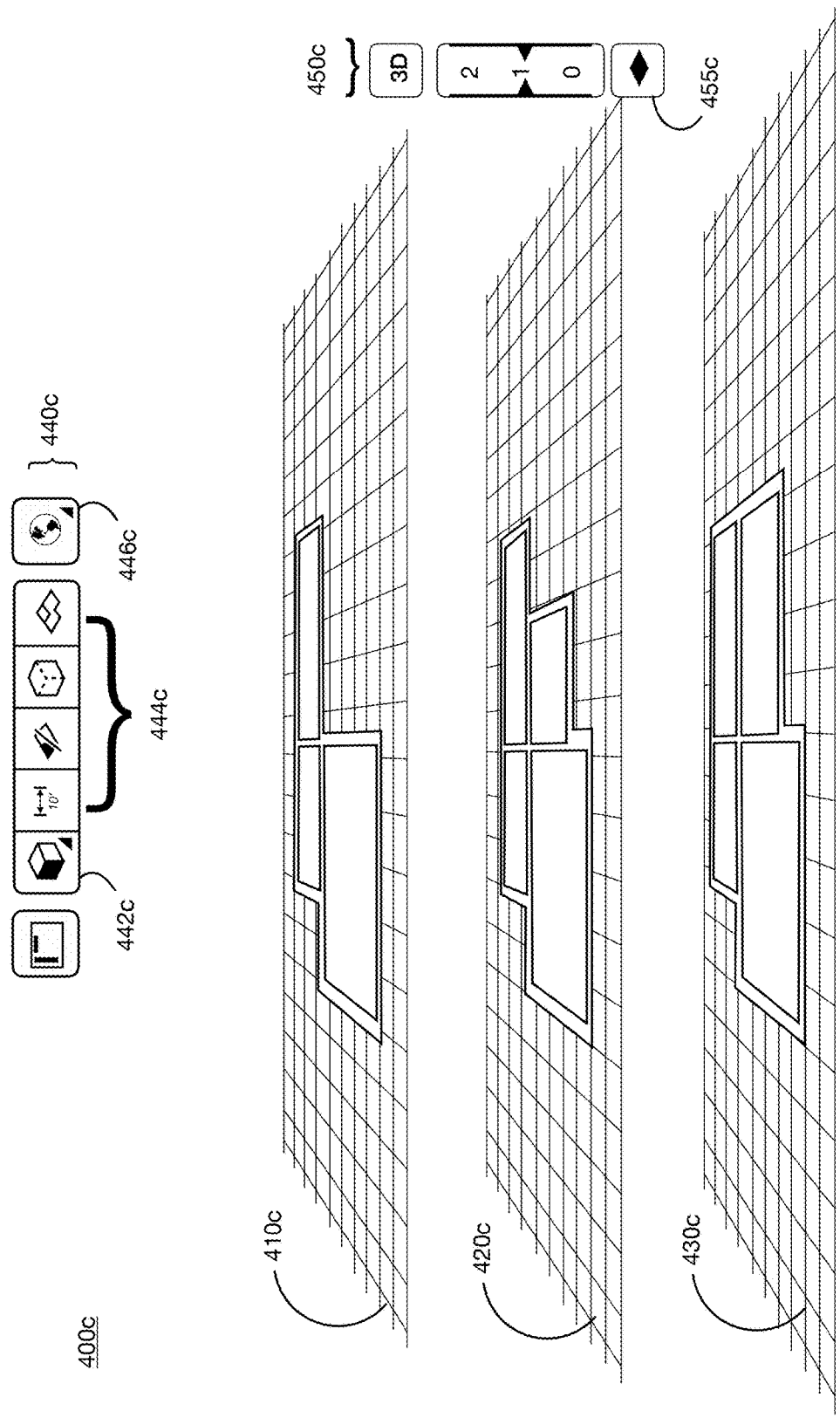
FIGS. 4C-4D illustrates example two-dimensional multiple floorplan views with a combined perspective/orthographic projection.

FIG. 4C illustrates an example two-dimensional multi floor graphical user interface 400c for visualizing floors within a building. This GUI 400c may be created as (or as part of) a building creation suite offered by the digital twin application device 200. As such, various elements may be projected, rendered or displayed by the user interface 230, UI tool library 234, virtual camera 232, or renderers 240 as may be directed by the scene manager 232. Further, the GUI 400a (and other GUIs presented herein) may be displayed along with other panes, panels, or UI elements not shown (e.g., as a single panel in a multi-panel interface). This GUI 400c may be displayed for a particular building such as a building previously associated with a building's digital twin or a building creator which allows a user to simultaneously create or modify a building while also simultaneously creating a digital twin for the building. As shown, this sample view includes a display of three floors of a building, shown such that all three floors are clearly visible. This approach introduces a distinctive perspective that isn't replicable in the real world. It combines an orthographic perspective with an perspective view creating an artistic mix, resulting in an engaging viewpoint that appears realistic while actually being a construct. Aside from the ease of viewing, this representation ensures that the floors' context is displayed without any overlapping.

In some embodiments, some number of grids (in this embodiment three) 410c, 420c, 430c are presented as two two-dimensional planes with a tilt in the third dimension. By tilting the grids toward the viewer in the third dimension, an optical illusion is achieved, wherein the grid edges converge at a vanishing point. This approach incorporates an orthographic-perspective blend. The unconventional twist involves manipulating the plane orientations for clarity. Each two-dimensional floorplan is presented at a slightly different three-dimensional location, with a slightly different tilt. This can be observed by noticing the difference in the lower left- and right hand edges of the grid. Each of the labels 410c, 420c and 430c are placed at the same XY location, yet each can be seen as being at a different location within their respective grids. Some details of how to create this view are discussed with reference to FIGS. 9A-9D.

GUI 400c also includes a collection of buttons 440c associated with UI tools, linked to interface scenes associated with the building, or that otherwise provide the user with the tools to interact with other aspects of the GUI 400c. Example tools to make available are a button for accessing a tool for performing measurements of the floor blueprints or other aspects of the environment; a button for adding or removing geometry from one or more of the renderings or aspects thereof; a button for returning to an interface scene providing location picker map; or a button to initiate placement (or re-placement) of a building in the environment using an autosmasher—a tool that both renders the actual environment around the building, be it landscape, buildings or a combination, and smashes the landscape in close proximity to the building, allowing the building to be viewed in-situ. Various additional interface elements (not shown) may also be provided for other interactions, such as changing (panning, zooming, rotating) the view of the building rendering or for initiating other functionality such as a shadow/sun exposure simulation. Some of the tools 442c, 446c may include extra menus 444c that appear then the tools are selected.

A rending setting selector 450c is also present. This rending setting selector 450c allows a user to switch from a two-dimensional view to a three-dimensional view and from viewing a single floor to viewing multiple floors. It also allows a user to determine which floor or floors to view. This rending setting selector will be explained in greater detail with reference to FIG. 5.

Figure 4D:
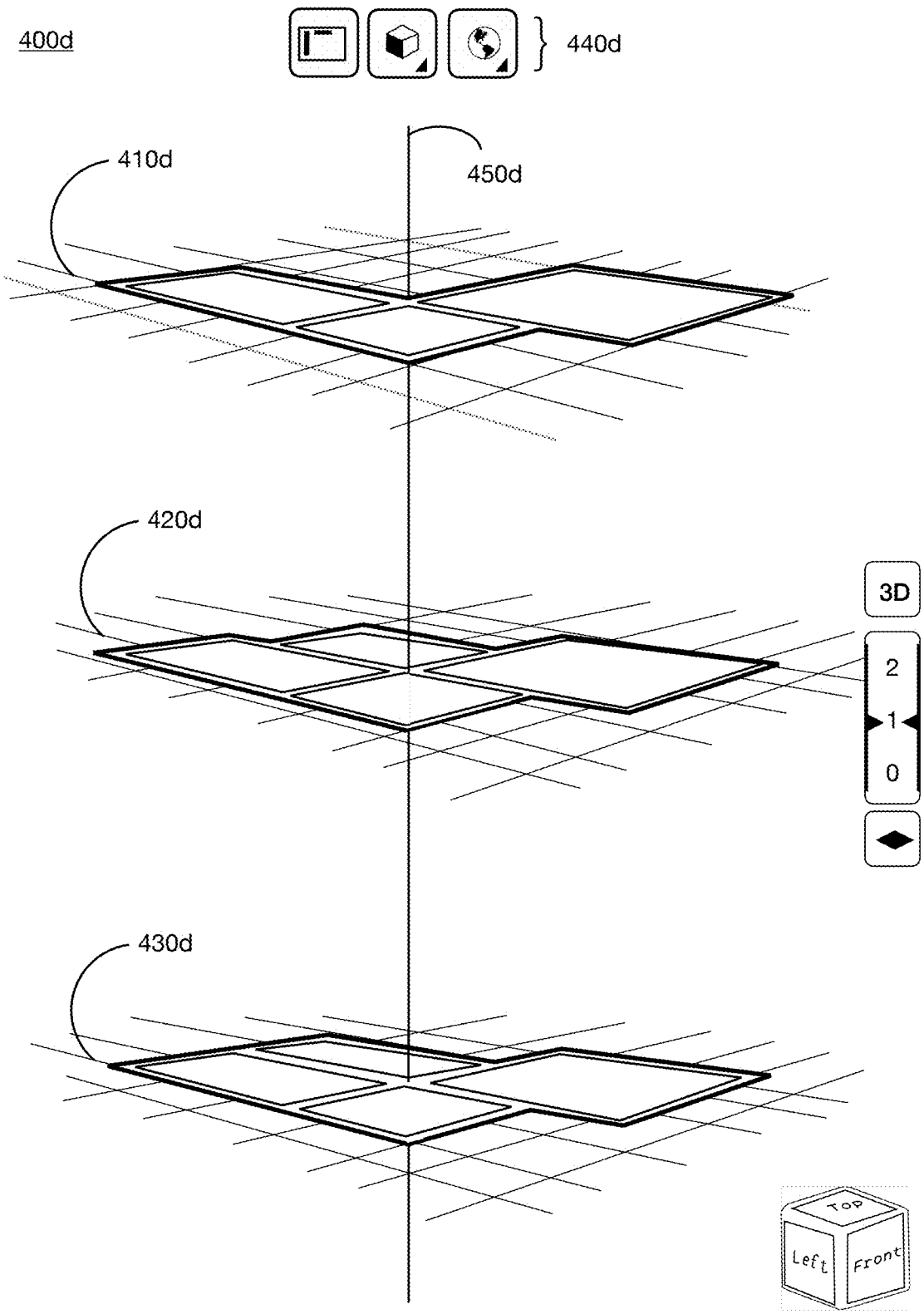

FIG. 4D illustrates a second graphical interface 400d of a two-dimensional view stacker floorplan 530. In some embodiments, the user may be able to adjust the view of the stacked floorplans, by, for example, clicking and dragging one of the floorplan grids 410d, 420d, 430d around a central axis 450d. This axis 450d may be visually present, or may be implied in that clicking and dragging moves the floorplans simultaneously. For example, FIG. 4C may be rotated to appear as FIG. 4D. In some embodiments, the axis may be able to be placed in a desired location such that the floorplans may be spun around the new axis. These floorplans may be displayed in the combined perspective orthographic view as shown with reference to FIGS. 9A-9D. As the axis (visual or implied) moves, the grid of the floorplans and the floorplans themselves may update in concert. The buttons 440d may appear closed, as here or open shown with reference to 4C at 446c.

FIG. 5 illustrates example graphical user interfaces 500 for a rending setting selector. This GUI 500 may be created as (or as part of) a building view screen offered by the digital twin application device 200. As such, various elements may be rendered or displayed by the user interface 230, UI tool library 234, virtual camera 242, or renderers as may be directed by the scene manager 232. As previously described, the subject view may be rendered (e.g., by the building renderer 242) from a digital twin or portion thereof.

The rending setting selector allows users to quickly and easily switch between useful views. In some embodiments, the rending setting selector 500 has various options associated when displayed in different states. A user can change between the different states by selecting either the two-dimensional/three-dimensional toggle or the single floor/multi floor toggle, giving four views that appear with the touch of a couple of toggles. Further, a floor picker allows a user to determine which floor or floors will be viewed. For example, if a building has 25 floors, using the floor picker, a user can quickly choose a single floor to view, or a set of several floors to view. A top rectangle 505, 506, 507, 508 of the widget displays the two-dimensional/three-dimensional toggle—an icon that toggles from "3D" 505 to "2D" 507. When "3D" is displayed on the toggle, the building being displayed has either a single or multiple floors shown in two dimensions. The two-dimensional view of a building with multiple floors is shown with reference to FIG. 4C with the widget displaying "3D" shown at 455c. Another view of a two-dimensional view of multiple floors is shown with reference to FIG. 4D. The single floor two-dimensional view of the same building is shown with reference to FIG. 7a, at 700a. The three-dimensional icon, "2D", can be seen in the rending setting selector at 720a. When "2D" is displayed, as shown at 820a in FIG. 8A, the building being displayed has some number of floors shown but rendered into a three-dimensional view.

The bottom rectangle 510, 511, 512, 513 of the widget displays the single/multi-floor toggle. The single floor icon 510, 511 shown when the multi-floor view is displayed, as shown at 620a with reference to FIG. 6A. The multi-floor icon 512, 513 is displayed when a single floor is displayed, as shown at 715a with reference to FIG. 7A. The floor picker in the middle of the widget (550) allows a user to choose which floor will be displayed on the user interface (If single floor) or which one will be emphasized (Multi floor). A user selects the desired floor, which is displayed in the view window 520, 521, 522, 523.

Figure 8B:
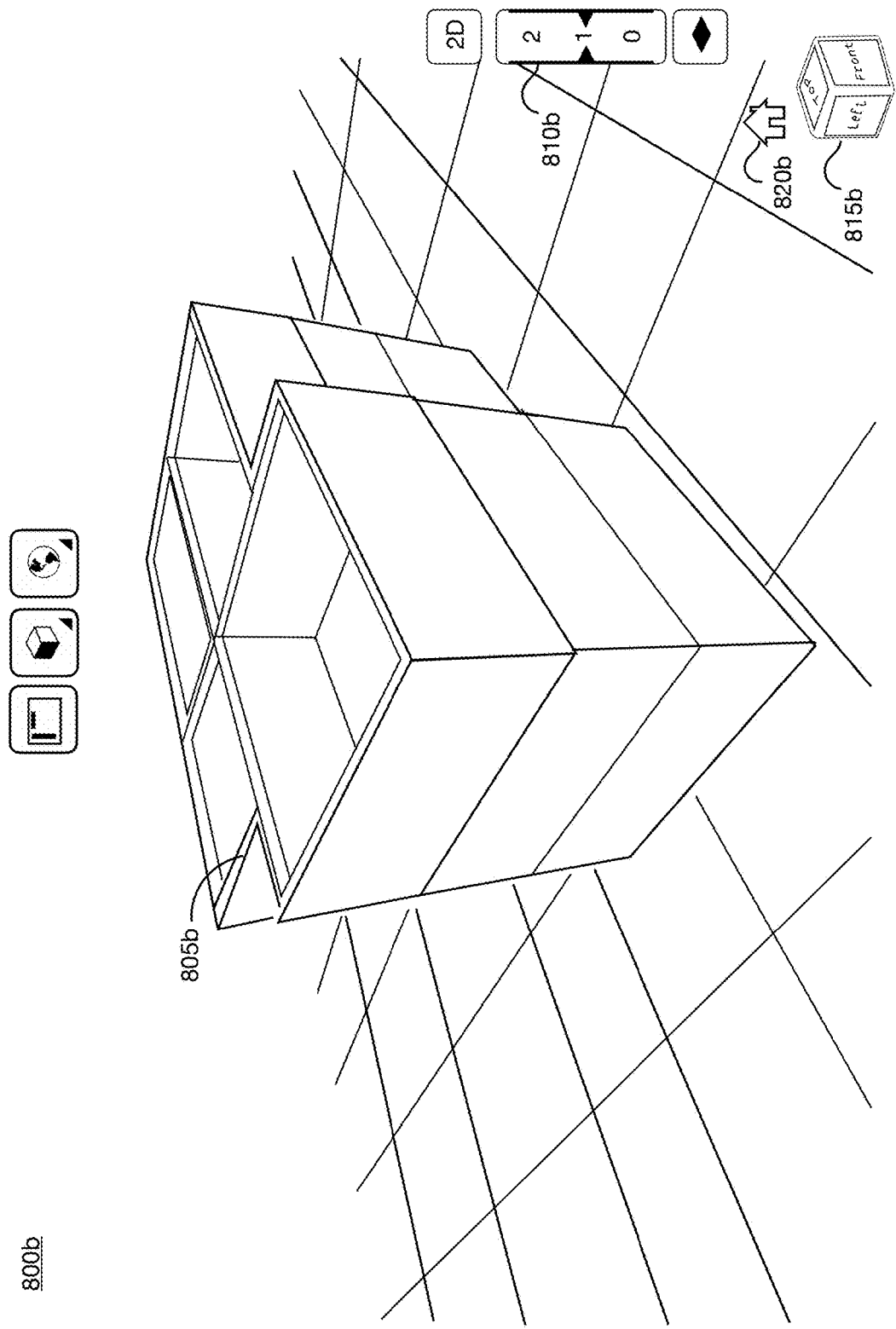
FIG. 8B illustrates an example three-dimensional multiple floor floorplan view.
Figure 8C:
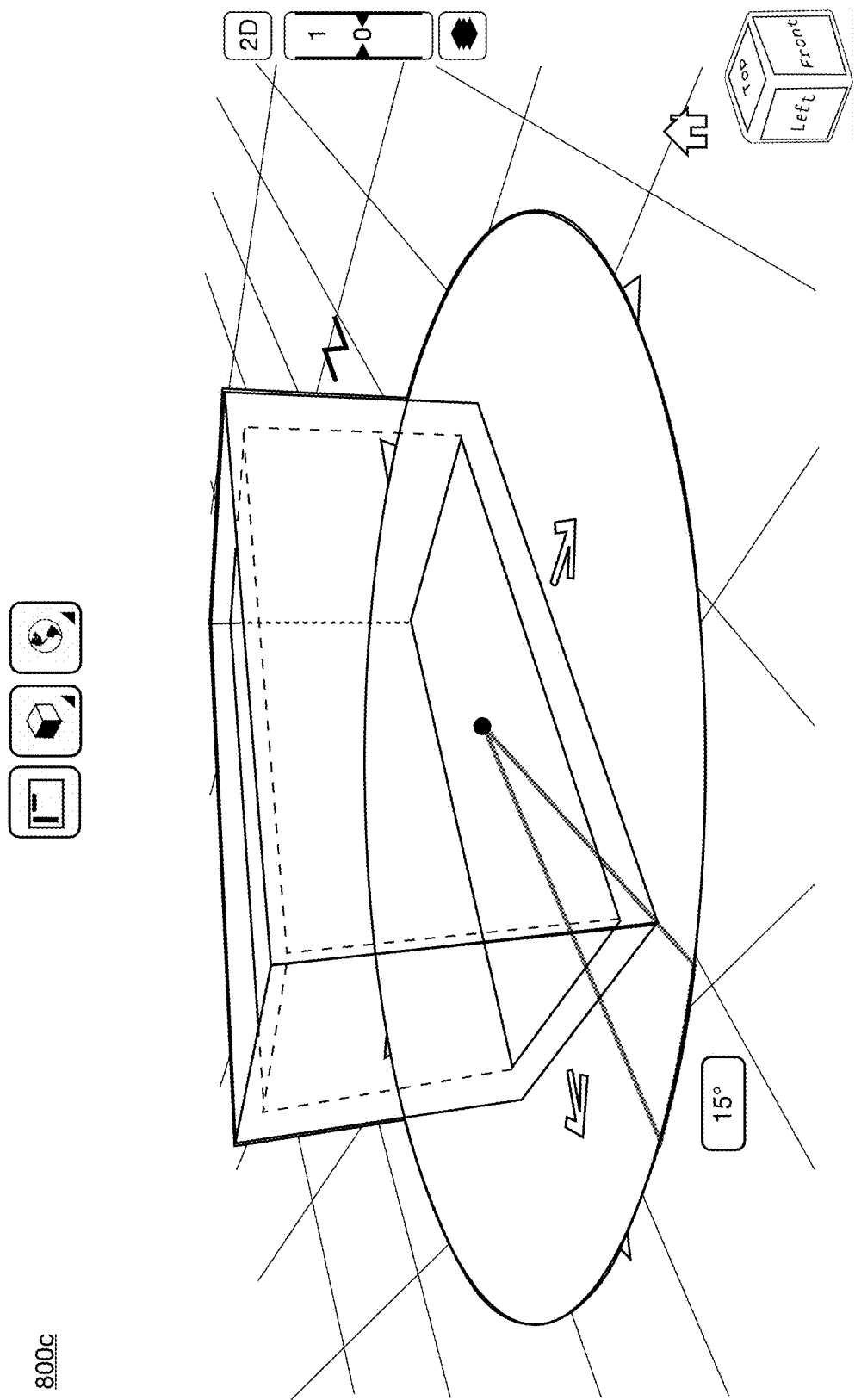
FIG. 8C illustrates an example three-dimensional single floor floorplan view with graphical user interface elements that allow modification of the floorplan.

FIG. 8A at 800a shows a three-dimensional display of a single floor, with floor 0 806a being the one displayed. FIG. 8B at 800b shows a multi-floor view with all three floors displayed that are shown in the view picker window 810b. In some embodiments, e.g., 550, the view picker window 555 displays more than three floorplans. In such a case, the graphical display will also display the number of floorplans as shown in the view picker window, in this case, 5. In some embodiments, when there are more floors than can be viewed within the view window, a user may spin the picker to show more floors. Each of the four possible 3D/two-dimensional Single/Multi floor options that can be chosen with the rendering setting selector will be described separately. The picker 550 shows which floor 521, 522, 523 will be shown in a single floor view, and what floor will be front and center in a multi-floor view. This view-switching may be achieved by a virtual camera 242 having a 3D scene of the digital twin building already created. When a user input is registered, the virtual camera is moved or the 3D scene is modified to adjust to the new view. This 3D scene may be assembled from Then that view is passed to a renderer 242, which creates a 2D image that is then displayed on a user interface 230.

Figure 6B:
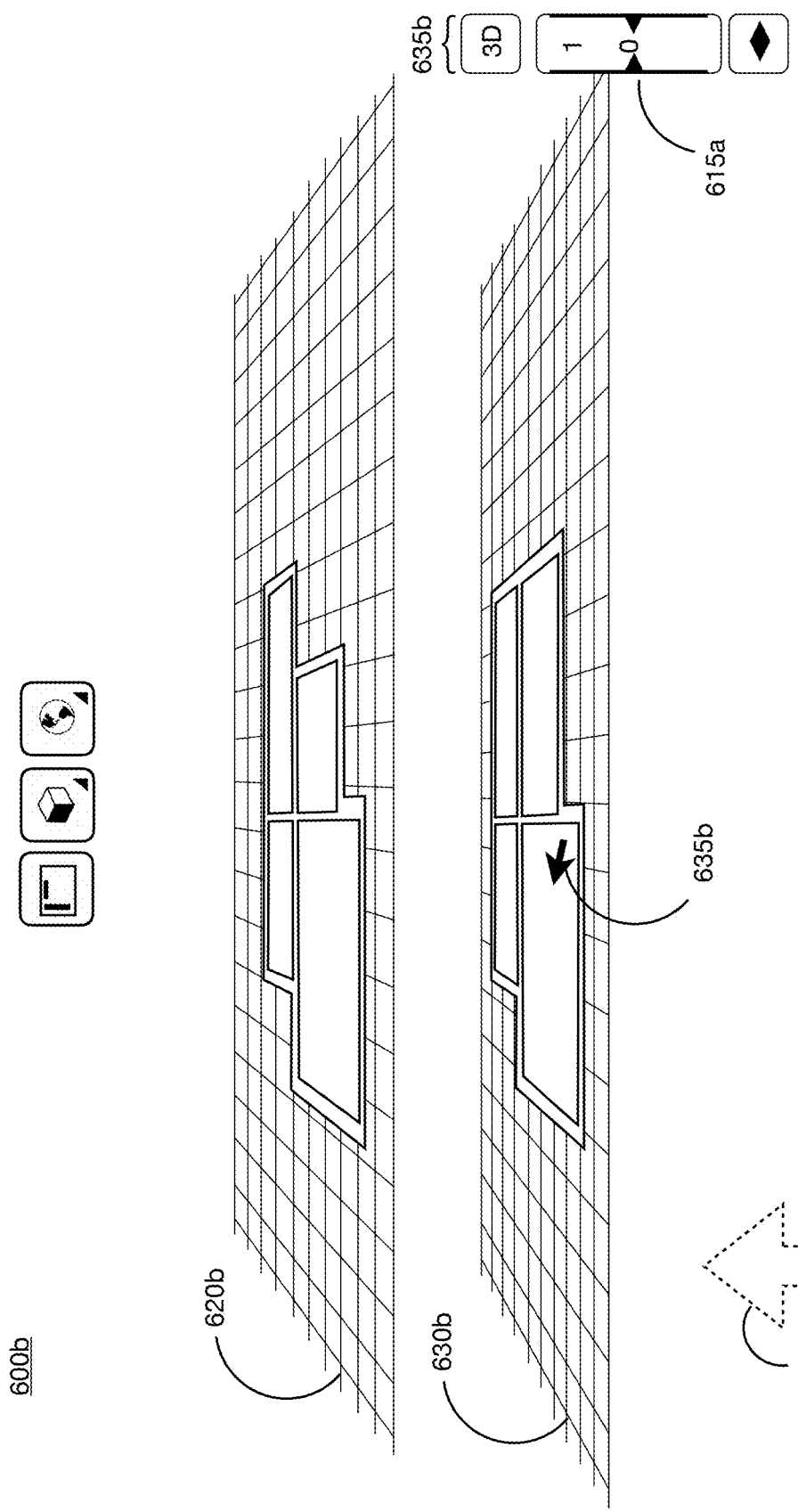

FIGS. 6A and 6B illustrates a third graphical interface 600a, 600b of a two-dimensional multi floor view stacker floorplan. A user may select a different floor than the one shown in the view window of the rending setting selector. In the illustrated example, the view was originally shown in FIG. 4C, with "1" as the center floor. The user now has selected "0." The floorplan grids 610a, 620a, 630a, now rise 605a (or lower) at an given pace until the chosen floor is in the center position 630b. The given pace may be an even pace, a pace that speeds up or slows down, or a different pace. In some embodiments the movement may stop and start. When a top or bottom floor is chosen, as the chosen floor is in the center position, there may be one less floor displayed than the display is set up to hold. FIG. 6B illustrates an ending position 600b of a floor display moving from one floor to another. In the given example, the 0th floor 615a has been chosen, so when it moves 605b into the center position 630b, floor 1 620b is now in the top position and there is no floor in the lower position. This floor location is mirrored in the rending setting selector 635b, as the picker shows the floors, from the top, 1, 0, and the lower position is blank, illustrating that there is no floor shown there, just as is seen on the user interface 600b. As the floors move from position to position on the user interface, their perspective and orthographic view also shifts to the view for the location.

Figure 7A:
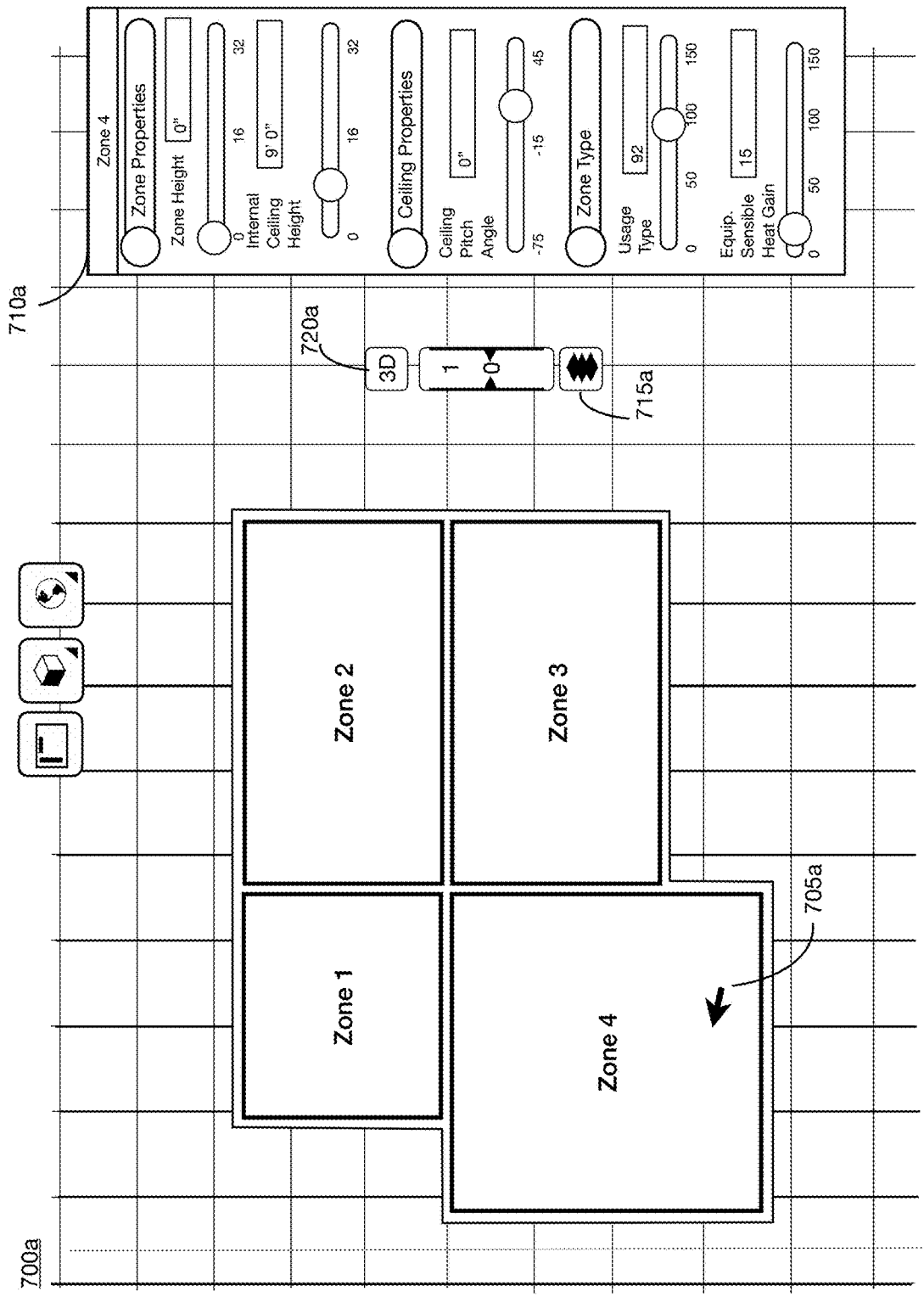
FIGS. 7A-7D illustrate example two-dimensional single floorplan views with graphical user interface elements that allow modification of the floorplan.

FIG. 7A illustrates a fourth graphical interface 700a of a two-dimensional single floor view stacker floorplan, e.g., 540. In some embodiments, a user can select a floorplan when there are multiple floorplans displayed, such as the two-dimensional multi-floor view shown in FIG. 4C. The floorplan may be selected by clicking on its visual image on the user interface, as indicated by the cursor 635b. This two-dimensional floorplan may also be selected by toggling the view switcher to the view shown with reference to 540 in FIG. 5. When a floorplan is selected, the chosen floorplan (0 in the current example) is displayed centered on the display in an orthographic view as show with reference to FIG. 7A. In some embodiments, the digital town application suite's 130 current interface may include Zone Information panel 710a that is used to more clearly describe a zone in the environment 110 (real or simulated) and by doing so, to more fully build the underlying digital twin 120. In the instant example, a user has selected zone 4 705a. In response a Zone Information Panel 710a has appeared on the screen. This panel may be located along a side of the user interface screen 700a, may be moveable around the user interface screen 700a, and so forth. In some embodiments, the values entered in the Zone Information Panel 710a will be inserted into the digital twin structure that represents zones e.g., 310, 320. Similar panels may exist for walls, windows, doors, and other building features. These panels may allow a user to set various thermal and other state aspects of the features. Thus, as the building is created in the user interface, the underlying digital twin is created as well.

Figure 7B:
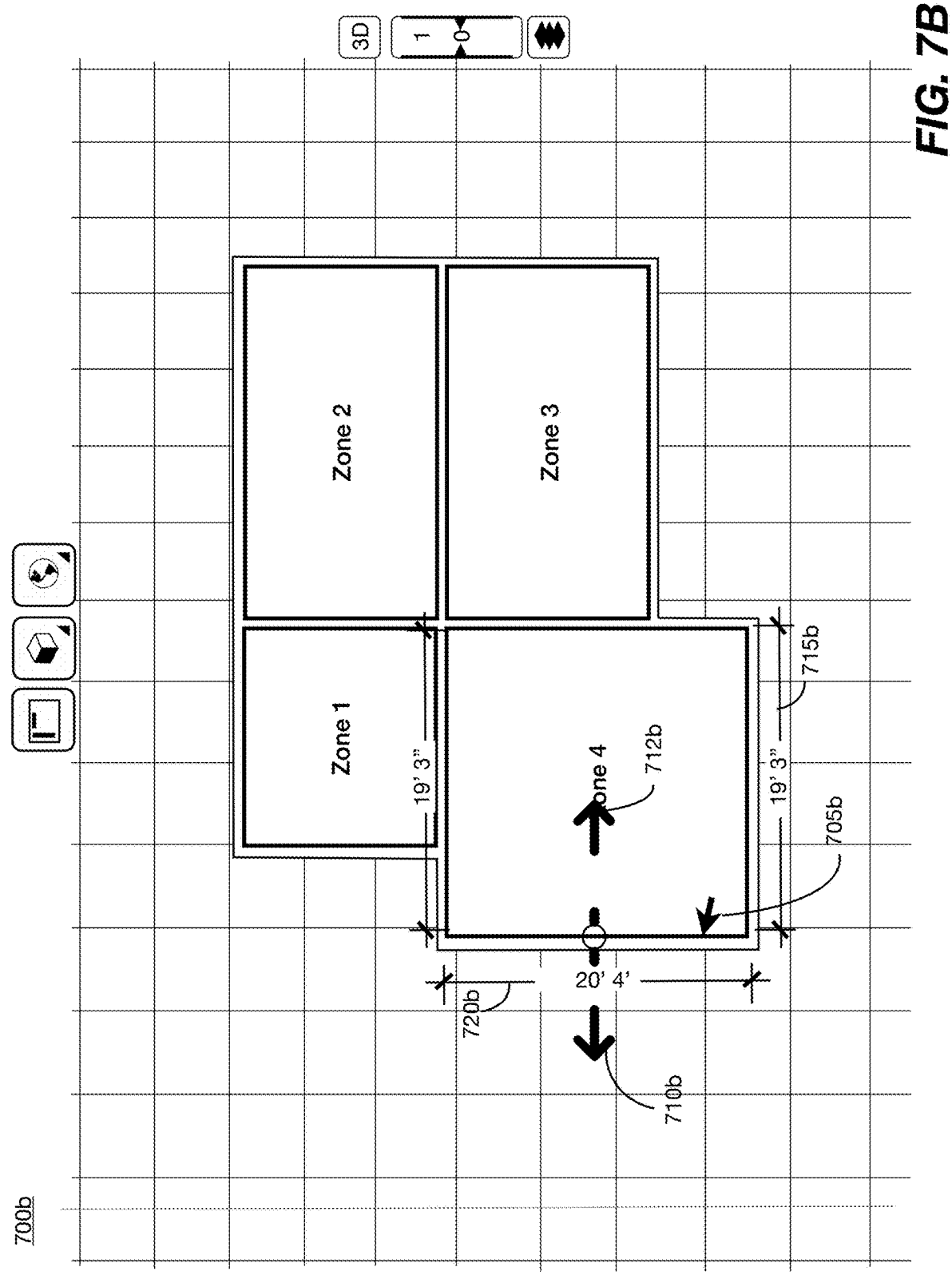

FIG. 7B illustrates an example modification graphical user interface element 700b. The GUI element 700b may provide various means for modifying the shape of the zones (which may be room representations) that make up each of the floorplans. Consequently, the floorplans themselves will change shape after the shape of the zones that make up the floorplans are modified. Adding or modifying the shape of the zones may also add or modify the underlying digital twin zones e.g, 310, 320. Modifying walls may modify wall nodes e.g., 311, 312, 315, 311, 313, 317. The modification GUI may be displayed when a two-dimensional single floor view is being displayed. In such a view, after a user has selected a wall 705*b* within the floorplan. The GUI element 700*b* also includes multiple UI elements 640 for allowing the user to access different views and UI tools. For example, the arrows 710*b*, 712*b* can be used to drag the wall boundary in the direction of the arrow. Clicking on another wall will display an arrow GUI that can be used to move that wall. As the arrow is moved, the length of the wall being dragged and other walls associated with the zone 715*b*, 720*b* may be displayed. In various alternative embodiments, the various icons shown may be replaced with other icons or omitted entirely. Various additional functions for the UI elements 700*b* will be apparent.

Figure 7C:
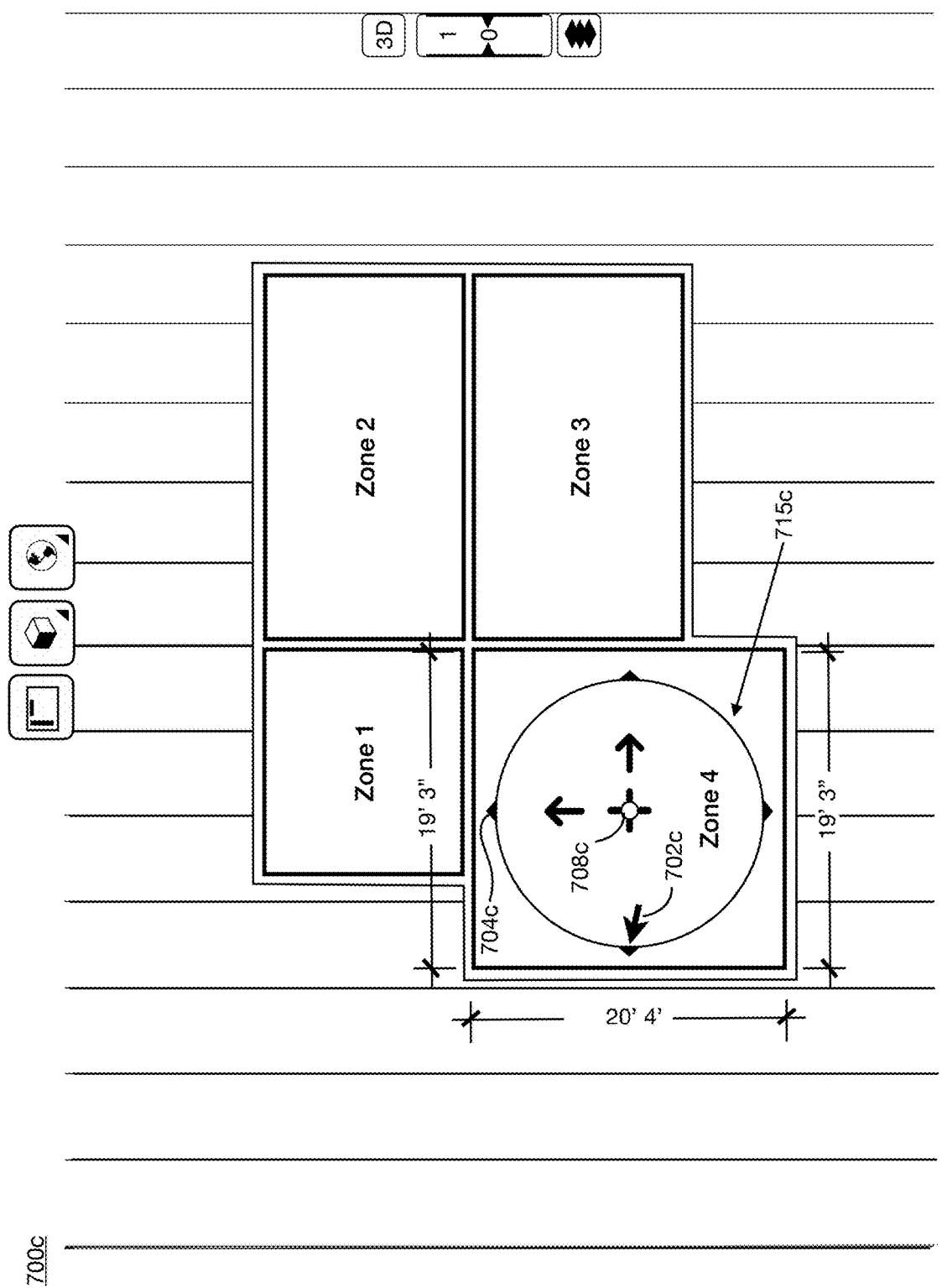

FIG. 7C displays another modification graphical user interface element 700*c*. The modification GUI element may be displayed when a two-dimensional single floor view is being displayed. In such a view, in some embodiments, when in the inside of a zone is chosen by a user, the circular GUI element 715*c* may be displayed. This GUI allows a user to move the entire zone. The user clicks on the inner axis GUI element 708*c*, which then unlocks the zone allowing it to be moved around a graph underlying the floorplan. This GUI element 715*c* may also allow the user to spin the chosen zone around a marked axis 708*c*. To spin, the user may grab 702*c* a handle 704*c*, of which some embodiments have four, some embodiments have more or fewer. After grabbing the handle, moving the cursor will spin the entire zone around the axis. Once the user is satisfied with the angle, the user may stop the action (e.g., by clicking a button or simply letting go of a current click-and-drag action). In various alternative embodiments, the various icons shown may be replaced with other icons or omitted entirely. Various additional functions for the UI elements 700*c* will be apparent. A similar GUI may be available for three-dimensional views that work similarly to the two-dimensional view described herein.

Figure 7D:
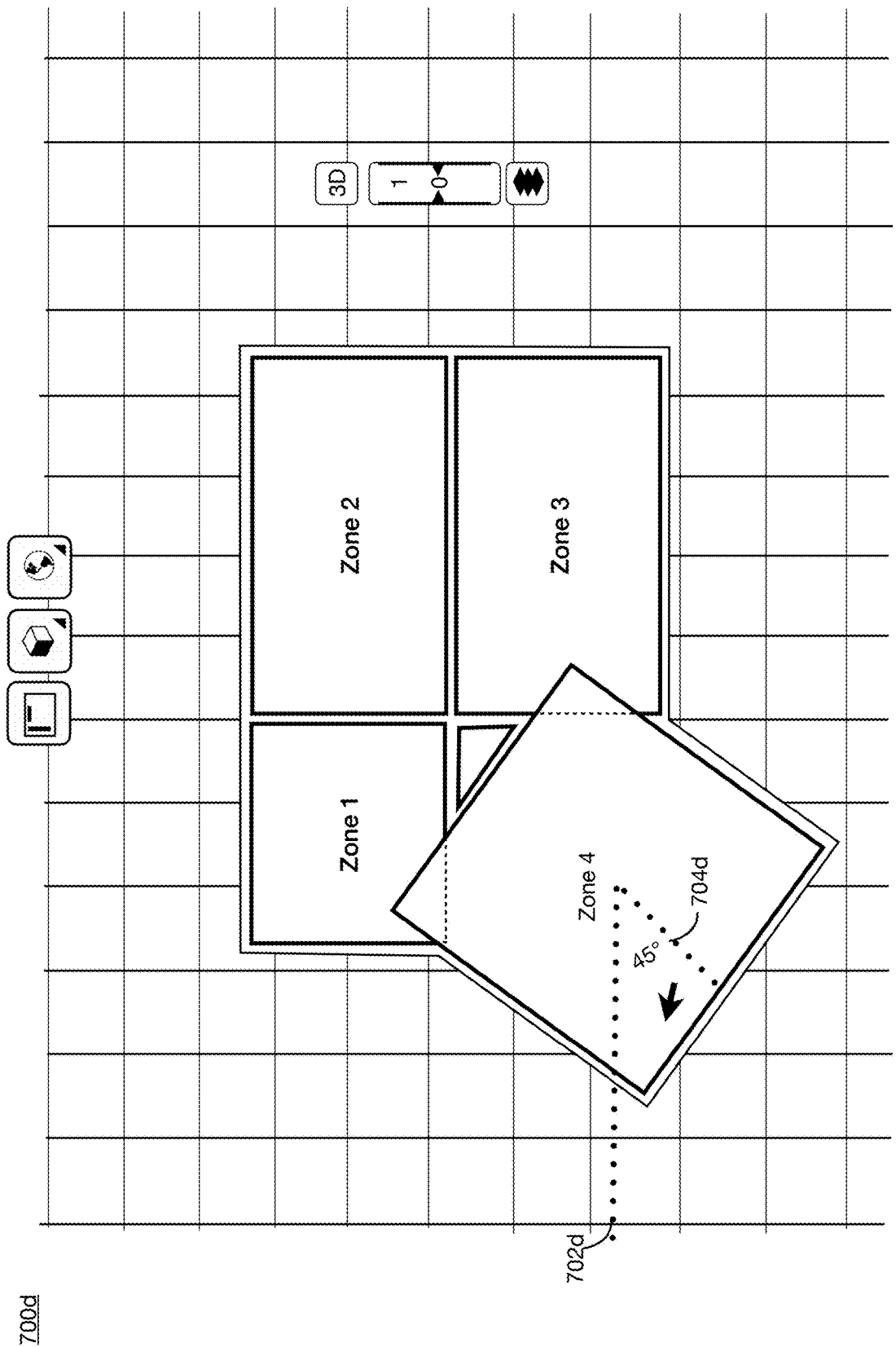

FIG. 7D illustrates the action of moving a zone around an axis, e.g., the axis shown with respect to 708*c*. After a handle 704*c* is grabbed, an extended line 70 two-dimensional that runs between the axis 708*c* and the chosen handle (e.g. 702*c*) is displayed. As the zone spins, a line indicating the current spin angle 70 two-dimensional is displayed, with the angle amount (e.g., 45°) also displayed. In various alternative embodiments, the various icons shown may be replaced with other icons or omitted entirely. Various additional functions for the UI elements 700*d* will be apparent.

FIG. 8A illustrates a graphical user interface 800*a* of a three-dimensional single floor view stacker floorplan, e.g., 545. This view is of the example floor 0, e.g., 630*b*. This floorplan may be able to be reached by selecting the view switcher toggles to two-dimensional and multi-floor, e.g., 535, 806*a*. This floor view may be able to be moved in three-dimensional by using a press and hold gesture anywhere on the grid (e.g., 802*a*). Once pressed, moving the cursor will move the image in three dimensions in an intuitive way. A view cube 808*a* orients the user by mirroring the action of the cursor such that the orientation of the cube is the same as the orientation of the building floor. The view cube is interactive, and users can click on its faces to change the camera's view. When a user clicks on a specific face of the cube, the view of the three-dimensional scene is adjusted to match the selected orientation. For example: clicking on the front face might align the camera's view with the front of the three-dimensional model. Clicking on the top face might align the camera's view with the top of the model. When a face of the view cube is selected, the grid view is shown with the same orientation. If the face marked "left" is chosen, then a perspective view that shows the grid and building from the left is shown. Selecting "Home" 810*a* returns to the default perspective, such as 800*a*. Various additional functions for the UI elements 800*a* will be apparent.

FIG. 8B illustrates a graphical user interface 800*b* used in a three-dimensional multi-view floor view stacker floorplan, e.g., 535. A perspective view of the three stories of the building 805*b* shown in the view picture 810*b* are displayed. In this view, the floors indicated on the floor picker of the rending setting selector 805*b* are shown, so the three floors shown are 0, 1, and 2 810*b*. If fewer floors are shown on the rending setting selector, such as only 0 and 1, then only those two floors with be shown in this GUI view, and so on. The user may move this view in three dimensions by a press and hold with the "held" mouse movements moving the view in an intuitive way. Users may also select a view cube face 815*b* to move the display to an indicated choice. For example, selecting the "top" view cube face will snap the view to viewing the building from the top. Selecting the "home" icon 820*b* will return to a preset home position. Various additional functions for the UI elements 800*b* will be apparent.

Figure 9A:
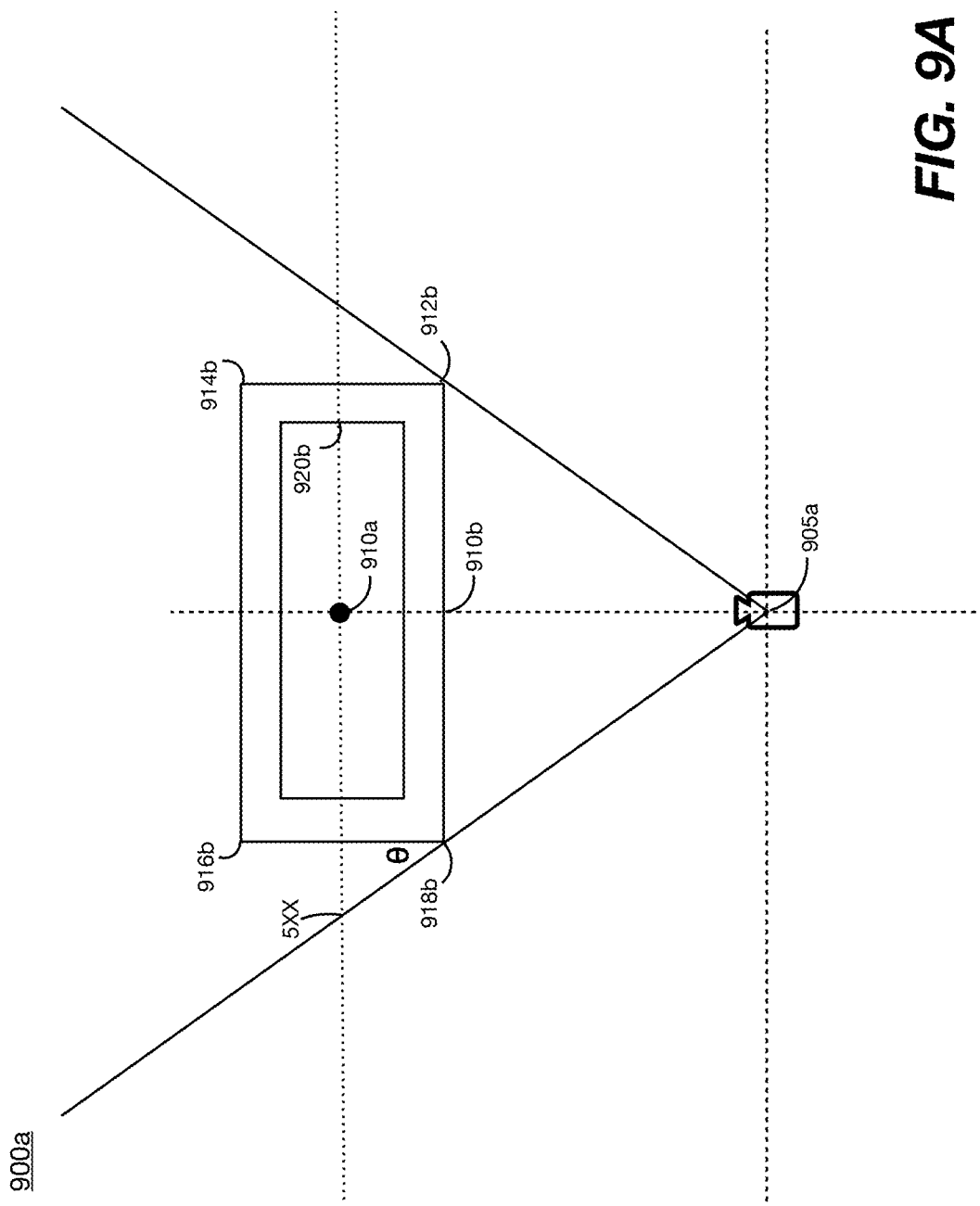

FIGS. 9A-9D illustrates an embodiment of the process of creating a combined projection with a combination of perspective projection and orthogonal projection. A camera in computer graphics is a virtual representation of a physical camera used to create images in a three-dimensional environment. FIG. 9A at 900*a* is a horizontal field of view (hFOV). The position 905*a* represents the location of the camera within the hFOV. The angular extent of the visible world along the horizontal axis s indicated by the points 912*b*, 914*b*, 916*b*, 918*b*. The middle point of the grids that will be rendered is the surface origin 910*a*. This is the halfway point between the left and right, and the front and back of the hFOV.

Figure 9B:
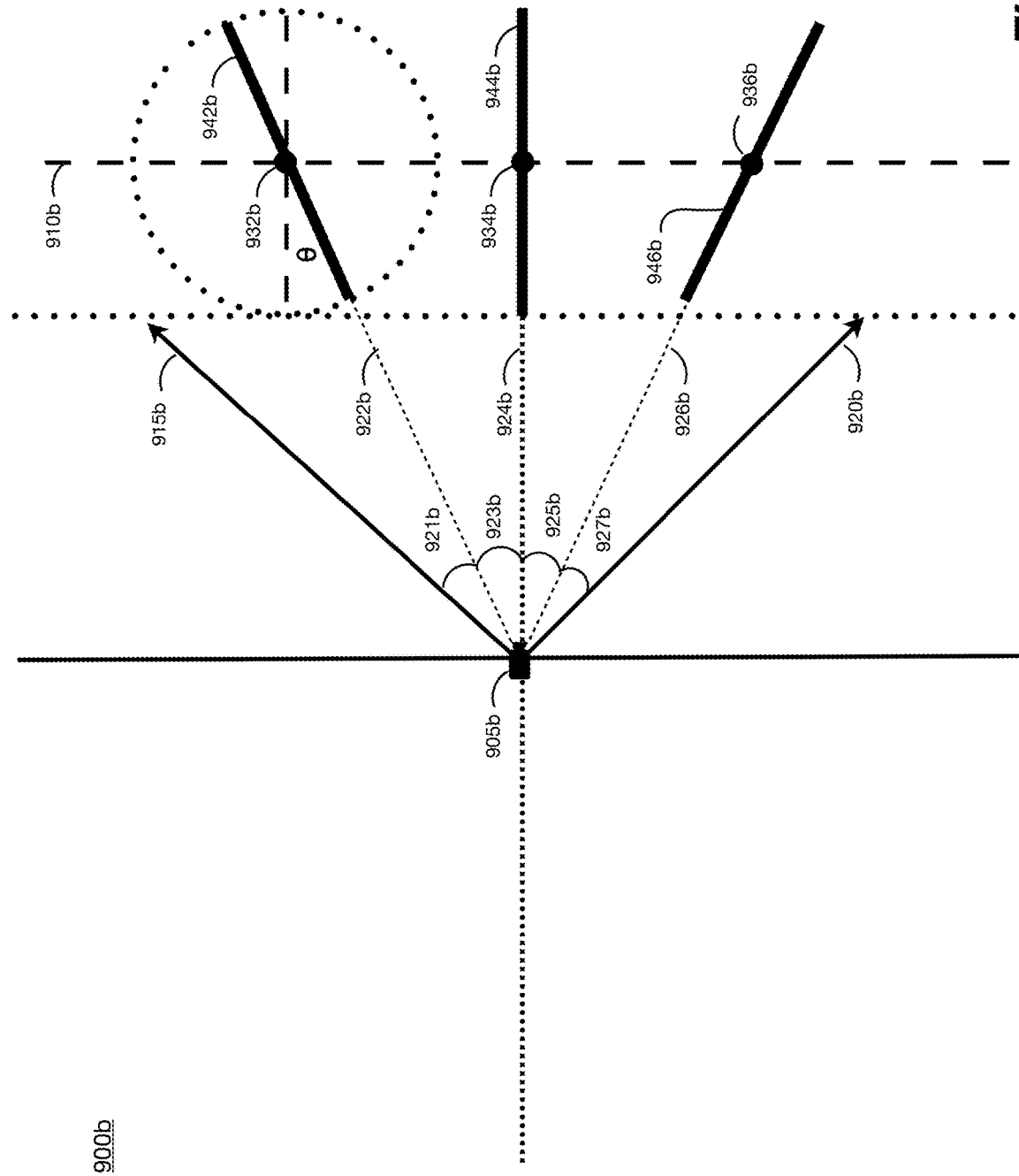

FIG. 9B at 900*b* illustrates vertical field of view (vFOV)—the angular extent of the visible world along the vertical axis of the multi-grid scene that is to be rendered. This is illustrate using the angle 915*b*-910*b*-920*b* A line along the z-axis that goes through the surface origin 910*b* is used to position the grids. When there are three grids that will be shown, the following method can be used. The vertical field of view is the height of the view in degrees from the top to the bottom the vertical field of view—in our figure, the angle defined by 915*b*, 905*b*, 920*b*. The vertical field of view is divided into four angle portions 921*b*, 923*b*, 925*b*, 927*b* (one more than the number of grids being drawn). Rays are cast along the inner angle portion lines 922*b*, 924*b*, 926*b* to where the cast rays intersect the z axis 932*b*, 934*b*, 936*b*. Surfaces 942*b*, 944*b*, 946*b* of the length and width chosen for the surfaces with floorplans that will eventually be rendered (e.g., 410*c*, 420*c*, 430*c*) are then drawn with their surface origin at the z-axis along the cast ray 932*b*, 934*b*, 936*b* along the cast rays 922*b*, 924*b*, 926*b*.

Figure 9C:
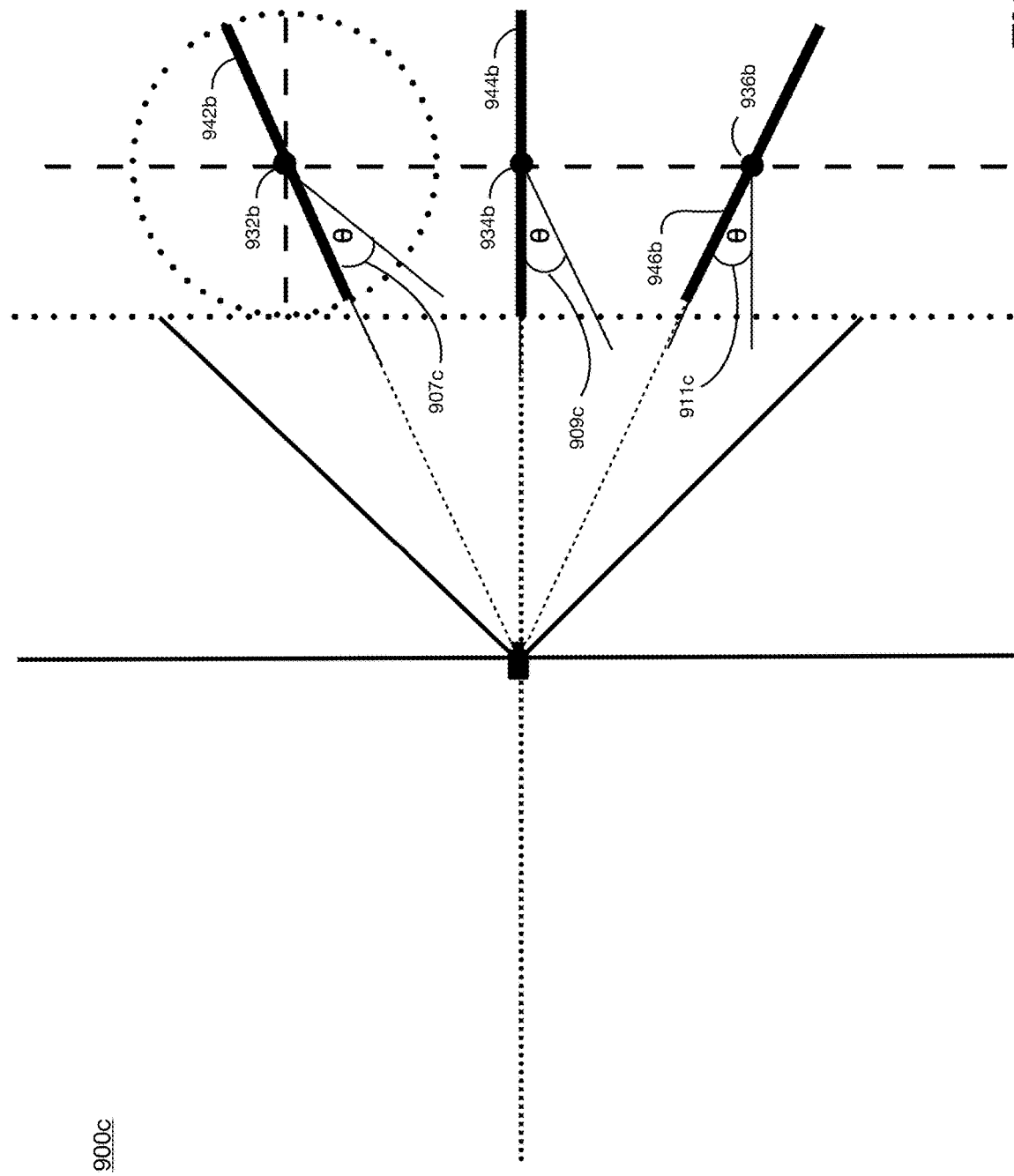

FIG. 9C at 900*c* illustrates an example of a step toward creating a combined perspective/orthographic view. A displacement angle θ is chosen. The surfaces displacement angle is then applied 907*c*, 909*c*, 911*c* to the current location of the surfaces, with the vertex of the angle at the origin 932*b* 934*b* 936*b*.

With reference to FIG. 9D, the surfaces have been spun around their XY origin point 932*b*, 934*b*, 936*b* the θ amount. The three-dimensional scene with the surface locations 942*d*, 944*d*, 946*d* is then used to render the floorplan surfaces, resulting in a combined perspective-orthogonal view. It is obvious how to modify this method to for a different number of floorplan grids. In some embodiments, the rotation amount θ is chosen such that the scenes do not occlude each other.

Figure 10:
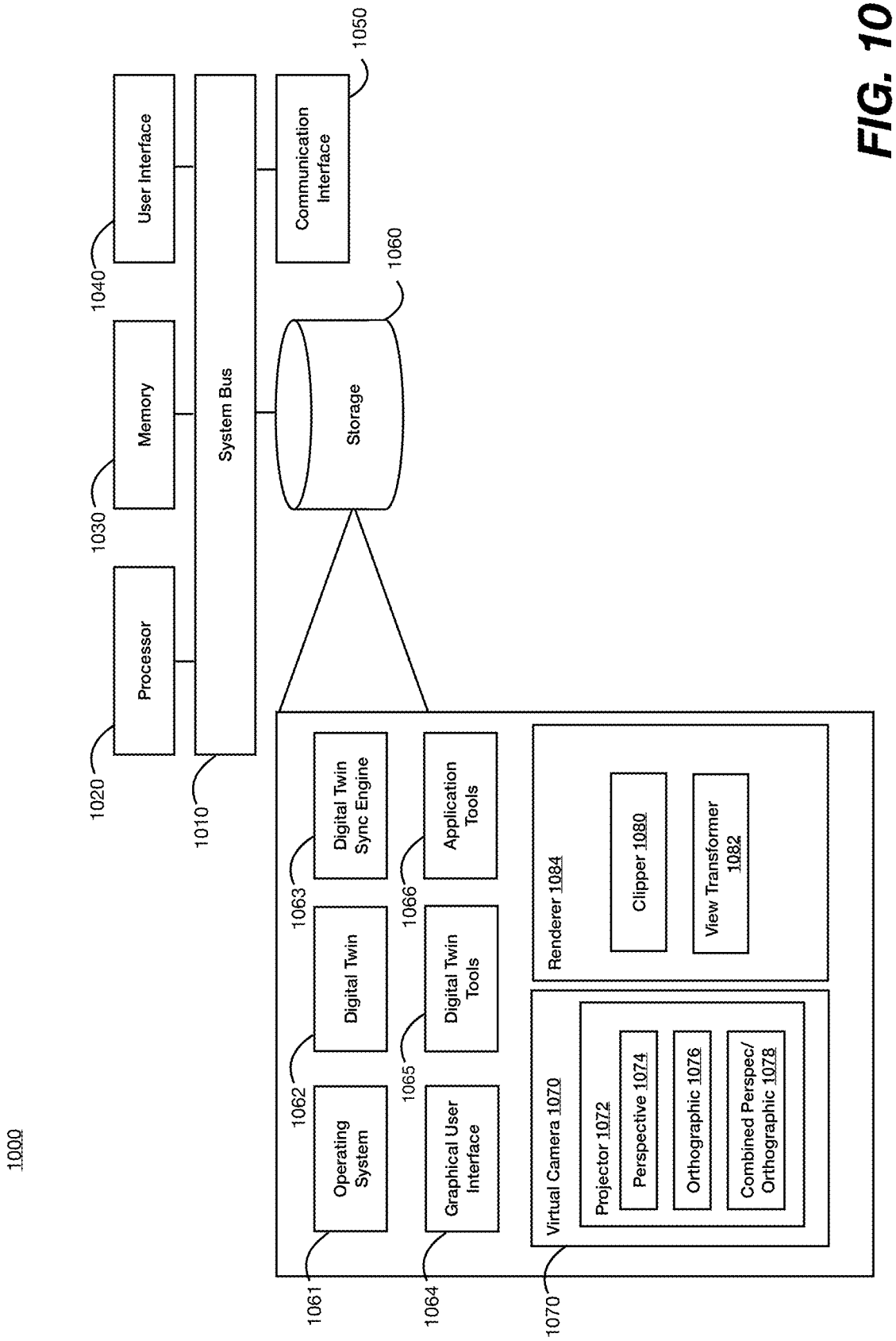
FIG. 10 illustrates an example hardware device for implementing a digital twin application device.

FIG. 10 illustrates an example hardware device 1000 for implementing a digital twin application device. The hardware device 1000 may describe the hardware architecture and some stored software of a device providing a digital twin application suite 130 or the digital twin application device 200. As shown, the device 1000 includes a processor 1020, memory 1030, user interface 1040, communication interface 1050, and storage 1060 interconnected via one or more system buses 1010. It will be understood that FIG. 10 constitutes, in some respects, an abstraction and that the actual organization of the components of the device 1000 may be more complex than illustrated.

The processor 1020 may be any hardware device capable of executing instructions stored in memory 1030 or storage 1060 or otherwise processing data. As such, the processor 1020 may include a microprocessor, field programmable gate array (FPGA), application-specific integrated circuit (ASIC), or other similar devices.

The memory 1030 may include various memories such as, for example L1, L2, or L3 cache or system memory. As such, the memory 1030 may include static random access memory (SRAM), dynamic RAM (DRAM), flash memory, read only memory (ROM), or other similar memory devices. It will be apparent that, in embodiments where the processor includes one or more ASICs (or other processing devices) that implement one or more of the functions described herein in hardware, the software described as corresponding to such functionality in other embodiments may be omitted.

The user interface 1040 may include one or more devices for enabling communication with a user such as an administrator. For example, the user interface 1040 may include a display, a mouse, a keyboard for receiving user commands, or a touchscreen. In some embodiments, the user interface 1040 may include a command line interface or graphical user interface that may be presented to a remote terminal via the communication interface 1050 (e.g., as a website served via a web server).

The communication interface 1050 may include one or more devices for enabling communication with other hardware devices. For example, the communication interface 1050 may include a network interface card (NIC) configured to communicate according to the Ethernet protocol. Additionally, the communication interface 1050 may implement a TCP/IP stack for communication according to the TCP/IP protocols. Various alternative or additional hardware or configurations for the communication interface 1050 will be apparent.

The storage 1060 may include one or more machine-readable storage media such as read-only memory (ROM), random-access memory (RAM), magnetic disk storage media, optical storage media, flash-memory devices, or similar storage media. In various embodiments, the storage 1060 may store instructions for execution by the processor 1020 or data upon with the processor 1020 may operate. For example, the storage 1060 may store a base operating system 1061 for controlling various basic operations of the hardware 1000.

The storage 1060 additionally includes a digital twin 1062, such as a digital twin according to any of the embodiments described herein. As such, in various embodiments, the digital twin 1062 includes a heterogeneous and omnidirectional neural network. A digital twin sync engine 1063 may communicate with other devices via the communication interface 750 to maintain the local digital twin 1062 in a synchronized state with digital twins maintained by such other devices. Graphical user interface instructions 1064 may include instructions for rendering the various user interface elements for providing the user with access to various applications. As such, the GUI instructions 1064 may correspond to one or more of the scene manager 232, UI tool library 234, component library 236, view manager 238, user interface 230, or portions thereof. Digital twin tools 1065 may provide various functionality for modifying the digital twin 1062 and, as such, may correspond to the digital twin modifier 252 or generative engine 254. Application tools 1066 may include various libraries for performing functionality for interacting with the digital twin 1062, such as computing advanced analytics from the digital twin 1062 and performing simulations using the digital twin 1062. As such, the application tools 1066 may correspond to the application tools 260.

The storage 1060 may also include one more virtual cameras. A virtual camera is a virtual representation of a physical camera used to create images in a 3-D environment. It simulates how a real-world camera works to prove a realistic rendering of a given image. The camera defines a viewing frustum (such as shown with reference to FIGS. 9A-D) which represents what the camera can see in a 3-D scene. This camera may include one or more projectors 1072 for projecting three-dimensional images onto the two-dimensional plane that for display to the user via the user interface 1040. The projector may include a perspective projector 1074. The prospective projector may project all the lines in the scene being displayed toward a single point, often referred to as the center of projection. This is intended to mimic the way our eyes see the world, but fails when multiple planes are projected using a single camera. An example of this is shown with reference to FIG. 4A. Another projector that may be included is an orthographic projector 1076. This orthographic projector 1076 may render a three-dimensional scene onto a two-dimensional pane in a way that preserves the relative side and positions of objects in he see, regardless of their distance from the camera. In an orthographic projection, all lines in the scene are projected parallel to each other. Thus, objects closer to the camera do not appear larger than objects further from the camera. A combined perspective and orthographic projector 1078 may be used to project the scenes to be rendered using a combination of orthographic and perspective projection techniques, such as described with relation to FIGS. 9A-D.

The storage 1060 may also include a collection of renderers 1084 for rendering various aspects of the digital twin 1062, for rendering various aspects of the digital twin 1062, its intended environment, information computed by the application tools 1066, or other information for display to the user via the user interface 1040. As such, the renderers 1084 may correspond to the renderers 240 and may be responsible for rendering two-dimensional or three-dimensional visualizations such as rendering 152 or the various renderings described with respect to FIGS. 4C, and 6A-8C. The renderers may also include a view transformer that takes a view transformation matrix (that may be provided by the virtual camera) and applies it to the three-dimensional scene to transform it to the virtual camera's 1070 local coordinate system. A clipper 1080 may also be used, after projection and transformation, to check which objects are outside of the viewing frustum. All such objects will be clipped and not rendered. A view transformer 1082 may be used to transform the different views using the rending setting selector, e.g., as shown with reference to FIG. 5 and the different view switcher views as described throughout.

While the hardware device 1000 is shown as including one of each described component, the various components may be duplicated in various embodiments. For example, the processor 1020 may include multiple microprocessors that are configured to independently execute the methods described herein or are configured to perform steps or subroutines of the methods described herein such that the multiple processors cooperate to achieve the functionality described herein, such as in the case where the device 1000 participates in a distributed processing architecture with other devices which may be similar to device 1000. Further, where the device 1000 is implemented in a cloud computing system, the various hardware components may belong to separate physical systems. For example, the processor 1020 may include a first processor in a first server and a second processor in a second server.

The storage 1060 may also include a collection of renderers 1084 for rendering a view specified by the rending setting selector, various aspects of the digital twin 1062, its intended environment, information computed by the application tools 1066, or other information for display to the user via the user interface 1040. As such, the renderers 1084 may correspond to the renderers 240 and may be responsible for rendering two-dimensional or three-dimensional visualizations such as rendering 152 or the various renderings described with respect to FIGS. 4A-8C. Thus, the renderers 1084 may include a building renderer for rendering the digital twin 1062 (or portions thereof) as a building and one or more overlay renderers for rendering information from the digital twin 1062 or applications tools 1066 as useful overlays.

Figure 11:
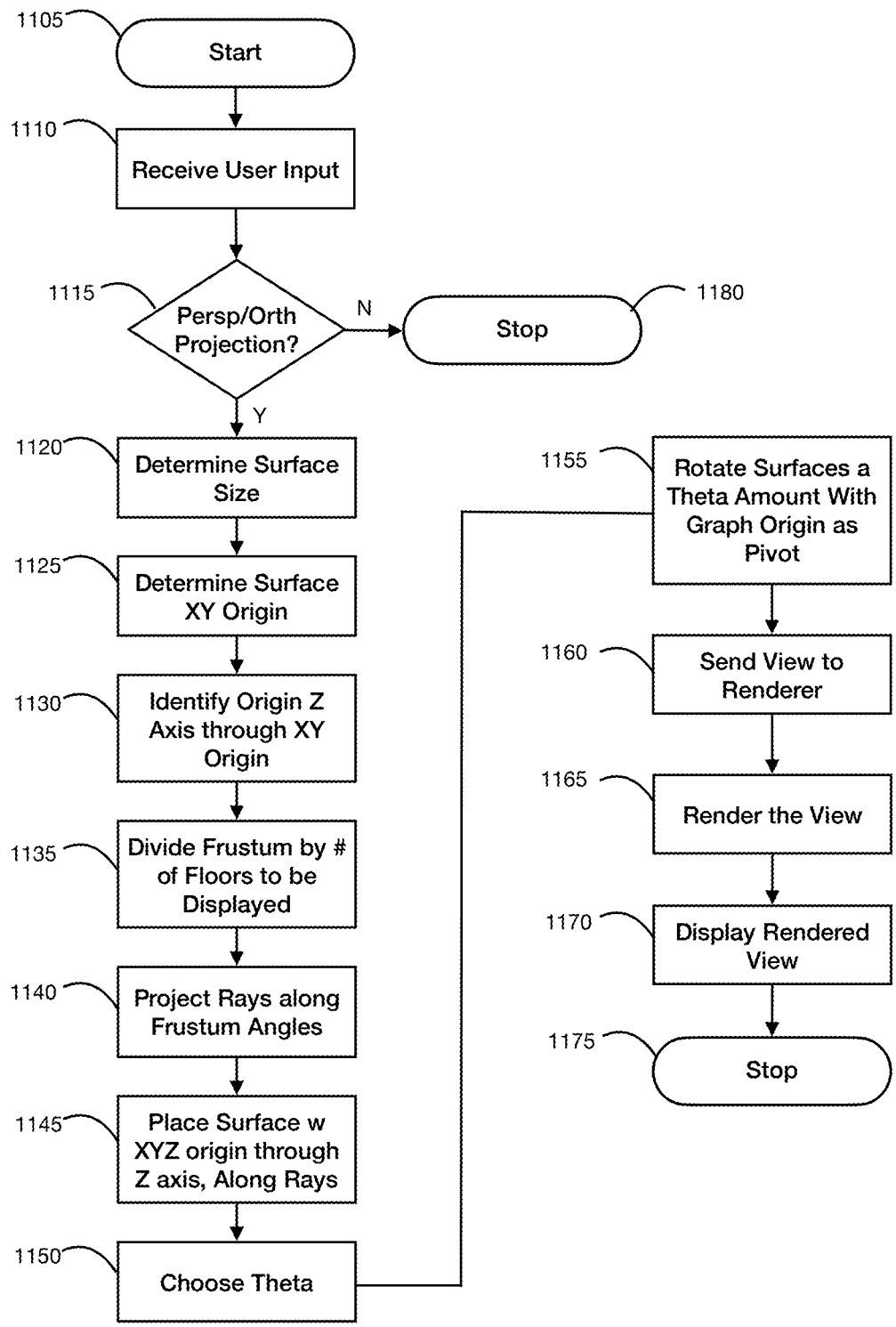
FIG. 11 illustrates an example method for displaying a floorplan.

FIG. 11 illustrates an example method 1100 for viewing an environment. The method 1100 may correspond to the virtual camera 242 or virtual camera 1070. In some embodiments this method may correspond to the virtual camera 1070 and the renderer 1084, or the virtual cameral 242 and the renderer 240. The method 1100 begins in step 1105 in response to, for example, a user choosing a multi-floor view for a model of a building within a digital twin. At step 1115 it is determined if a combined perspective/orthographic projection is required. If not, at 1180 this method ends. If so, the method continues at step 1120. A perspective/orthographic projection may be needed when a multi-floor two-dimensional view has been requested. This view may also be displayed when the view chooser widget 530 has been chosen by a user—the multi-floor two-dimensional view. Other times this may be triggered is when a multi-floor view might already be displayed, but the view is modified by a user using the user interface to move the view, such as by rotating it, shifting it in space, etc. The method 1100 then proceeds to step 1120 where the size of individual surfaces/floorplans that will be displayed is chosen based on the specific view that will be rendered. Then, at 1125, the XY origin of the surfaces is chosen along the hFOV. Once the XY origin is known, then at 1130 the Z origin axis for is selected at that point that runs through the XY axis orthogonal to the XY viewing plane. Depending on the number of floors that are to be displayed, the view frustum of the camera is divided into that many +1 equal degree angles with reference to the vFOV; e.g., 921b, 923b, 925b, 927b. The vFOV represents the height of the view in degrees from the top to the bottom. In some embodiments, the angles may not be equal. For example, when equal degrees are being used, if three floorplans are to be displayed, and the view frustum is 90°, then the view frustum would be divided into four angles of 22.5°. Then, at 1140 a two-dimensional ray is cast from the camera location down the middle angle lines within the vertical field of view (e.g., 922b, 924b, 926b) such that there are the same number of rays projected as there are floors to be rendered. These rays intersect the Z surface origin. Where the rays intersect the Z surface origin, at 1145, a two-dimensional orthographic graph with the appropriate floor floorplan is placed along the cast ray with the origin at the XYZ surface origin—the origin that runs from the middle of the floor graph through the Z origin axis. In FIG. 9B, the floorplans are viewed in the YZ plane on edge, such that only a single line can be seen. In FIG. 9A, in the XY axis, the full size of a floorplan can be seen at 920b. Next, at 1150, an amount that the individual surfaces will be tilted is chosen—theta. This amount should be such that in the final rendering, the different floor surfaces do not occlude each other. At step 1155, the surfaces are rotated a theta number of degrees around their internal XY axis from their position at 1145, using the y-z origin axis 910d as the pivot point, as seen with relation to FIGS. 9C and 9D. This correctly places the two-dimensional orthographically projected surfaces within the three-dimensional field of view. Then, this scene with the orthographic floorplans is transformed using a perspective projection such that the originally orthographic floorplans are drawn with a perspective projection, which may be one- or two- or three-point, depending on the specific view. This three-dimensional scene is then passed to the renderer at step 1165 which renders the three-dimensional scene into a two-dimensional image. FIG. 4C shows three orthographic floors projected using single point projection, with the converging lines meeting at a single point. FIG. 4D shows three orthographic floors projected at a different angle using two point projection. That is, the converging lines meet at two points. The renderer may then create the two-dimensional image from the three-dimensional scene received from the camera. Color, shading, and texture may be added to the image by the renderer. This rendering may be accomplished according to any known approach such as z-buffer rendering or raytracing. Once rendered, at step 1170 the rendered image is then displayed on a user interface. The method then proceeds to end in step 1175.

It should be apparent from the foregoing description that various example embodiments of the invention may be implemented in hardware or firmware. Furthermore, various exemplary embodiments may be implemented as instructions stored on a machine-readable storage medium, which may be read and executed by at least one processor to perform the operations described in detail herein. A non-transitory machine-readable storage medium may include any mechanism for storing information in a form readable by a machine, such as a personal or laptop computer, a mobile device, a tablet, a server, or other computing device. Thus, a machine-readable storage medium may include read-only memory (ROM), random-access memory (RAM), magnetic disk storage media, optical storage media, flash-memory devices, and similar storage media.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in machine readable media and so executed by a computer or processor, whether or not such computer or processor is explicitly shown.

Although the various exemplary embodiments have been described in detail with particular reference to certain example aspects thereof, it should be understood that the invention is capable of other embodiments and its details are capable of modifications in various obvious respects. As is readily apparent to those skilled in the art, variations and modifications can be affected while remaining within the spirit and scope of the invention. Accordingly, the foregoing disclosure, description, and figures are for illustrative purposes only and do not in any way limit the scope of the claims.

We claim:

1. A method for displaying a set of floorplans on a user interface, comprising:
    associating a first floorplan image associated with the set of floorplans with a first surface in a three-dimensional scene;
    associating a second floorplan image associated with the set of floorplans with a second surface in the three-dimensional scene;
    associating a third floorplan image associated with the set of floorplans with a third surface in the three-dimensional scene;
    rendering a stacked floorplan image of the three-dimensional scene, whereby the rendering comprises:
        casting a number of rays from a virtual camera used to create the three-dimensional scene;
        placing the first floorplan image along a first ray cast from a virtual camera;
        tilting the first floorplan image a first number of degrees;
        placing the second floorplan image along a second ray cast from a virtual camera;
        tilting the second floorplan image a second number of degrees;
        placing the third floorplan image along a third ray cast from a virtual camera;
        tilting the third floorplan image by a third number of degrees; and
        rendering the first floorplan image, the second floorplan image and the third floorplan image to produce a stacked floorplan image; and
    displaying the stacked floorplan image on the user interface.

2. The method of claim 1, wherein the stacked floorplan image includes the first floorplan image and the second floorplan image arranged vertically.

3. The method of claim 1, further comprising:
    accepting user rotation input; and
    wherein the first surface and the second surface are rotated by an amount associated with the user rotation input.

4. The method of claim 1, wherein a vertical field of view in degrees of the three-dimensional scene is divided to determine location of the first ray, the second ray, and the third ray.

5. The method of claim 4, wherein the vertical field of view in degree is divided equally into x areas, where x equals a number of surfaces plus 2.

6. The method of claim 5, wherein each of the X areas are an equal number of degrees.

7. The method of claim 4, wherein the vertical field of view comprises a first world ray cast from the virtual camera tangent to a left extent of a visible world to a second world ray cast from the virtual camera tangent to a right extent of the visible world.

8. The method of claim 7, wherein the visible world is the first floorplan image.

9. The method of claim 8, wherein the first number of degrees is an angle created by the first world ray and the left extent of the visible world.

10. The method of claim 9, wherein the first floorplan image is tilted by the first number degrees around an x, y origin point of the first floorplan image.

11. The method of claim 1, wherein the first number of degrees is same as the second number of degrees.

12. A non-transitory machine-readable storage medium encoded with instructions for execution by a processor for displaying floorplans on a user interface, the non-transitory machine-readable storage medium comprising:
    instructions for associating a first floorplan image with a first surface in a three-dimensional scene;
        instructions for associating a second floorplan image with a second surface in the three-dimensional scene;
    instructions for associating a third floorplan image associated with a third surface in the three-dimensional scene;
    instructions for rendering a stacked floorplan image of the three-dimensional scene, whereby the rendering comprises:
    instructions for casting a number of rays from a virtual camera used to create the three-dimensional scene;
    instructions for placing the first floorplan image along a first ray cast from a virtual camera;
    instructions for tilting the first floorplan image a first number of degrees;
    instructions for placing the second floorplan image along a second ray cast from a virtual camera;
    instructions for tilting the second floorplan image a second number of degrees;
    instructions for placing the third floorplan image along a third ray cast from a virtual camera;
    instructions for tilting the third floorplan image by a third number of degrees; and
    instructions for rending the first floorplan image, the second floorplan image and the third floorplan image to produce a stacked floorplan image; and
    instructions for displaying the stacked floorplan image on the user interface producing a displayed floorplan image.

13. The non-transitory machine-readable storage medium of claim 12, further comprising instructions for accepting user input of a selection of a floor on the displayed floorplan image producing a selected floorplan image.

14. The non-transitory machine-readable storage medium of claim 13, further comprising:
    instructions for rendering the selected floorplan image in an orthographic projection; and
    instructions for displaying the selected floorplan image.

15. The non-transitory machine-readable storage medium of claim 12, further comprising:
    instructions for accepting user rotation input; and
    instructions for rotating the stacked floorplan image an amount associated with the user rotation input, producing a rotated stacked floorplan image.

16. The non-transitory machine-readable storage medium of claim 15, further comprising instructions for rendering the rotated stacked floorplan image; and instructions for displaying the rotated stacked floorplan image on the user interface.

17. A device for displaying a set of floorplans on a user interface, the device comprising:

a memory storing description of at least a first floorplan image, a second floorplan image and a third floorplan image; and a processor in communication with the memory configured to:

associate the first floorplan image with a first surface in a three-dimensional scene;

associate the second floorplan image with a second surface in the three-dimensional scene;

associate the third floorplan image with a second surface in the three-dimensional scene; and render a stacked floorplan image of the three-dimensional scene;

whereby the render comprises:

cast a number of rays from a virtual camera used to create the three-dimensional scene;

place the first floorplan image along a first ray cast from the virtual camera;

tilt the first floorplan image a first number of degrees;

place the second floorplan image along a second ray cast from the virtual camera;

tilt the second floorplan image a second number of degrees;

place the third floorplan image along a third ray cast from the virtual camera;

tilt the third floorplan image by third number of degrees; and render the first floorplan image, the second floorplan image and the third floorplan image to produce a stacked floorplan image; and display the stacked floorplan image on the user interface.

18. The device of claim 17, further comprising:

accepting user input indicating selection of a floorplan within the stacked floorplan image; and displaying an image associated with the selected floorplan image in an orthographic view.

19. The device of claim 18, further comprising creating an animation of the image associated with the selected floorplan moving from its location within the stacked floorplan image to an orthographic view.

20. The device of claim 17, wherein a vertical field of view in degrees of the three-dimensional scene is divided to determine location of the first ray, the second ray, and the third ray.

* * * * *